United States Patent
Leary et al.

(10) Patent No.: US 11,488,073 B2
(45) Date of Patent: Nov. 1, 2022

(54) AUTONOMOUS VEHICLE RIDER DROP-OFF TO DESTINATION EXPERIENCE

(71) Applicant: GM Cruise Holdings LLC, San Francisco, CA (US)

(72) Inventors: Jessica Leary, San Francisco, CA (US); Theresa Foy, San Francisco, CA (US); Soleil Phan, San Francisco, CA (US); Tal Benisty, San Francisco, CA (US); Stephanie Engle, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 497 days.

(21) Appl. No.: 16/457,799

(22) Filed: Jun. 28, 2019

(65) Prior Publication Data

US 2020/0408531 A1 Dec. 31, 2020

(51) Int. Cl.
*G06Q 10/02* (2012.01)
*B60Q 9/00* (2006.01)
(Continued)

(52) U.S. Cl.
CPC ............ *G06Q 10/02* (2013.01); *B60N 2/002* (2013.01); *B60Q 9/00* (2013.01); *G01C 21/20* (2013.01);
(Continued)

(58) Field of Classification Search
CPC ........ G06Q 10/02; G06Q 50/30; B60N 2/002; B60Q 9/00; G01C 21/20; G01C 21/3661; G05D 1/0088; G05D 1/0246; G05D 1/0257; G05D 1/0278; G05D 2201/0213; G08G 1/202
(Continued)

(56) References Cited

U.S. PATENT DOCUMENTS

2015/0219464 A1 8/2015 Beaurepaire et al.
2016/0209843 A1 7/2016 Meuleau et al.
(Continued)

OTHER PUBLICATIONS

International Search Report and Written Opinion for International Application No. PCT/US2019/068319, dated Apr. 2, 2020, 10 pages.
(Continued)

*Primary Examiner* — Gertrude Arthur Jeanglaude
(74) *Attorney, Agent, or Firm* — Polsinelli, PC

(57) ABSTRACT

An example method for assisting autonomous vehicle (AV) riders reach their destination after drop-off can include navigating the AV to a drop-off location associated with a user in the AV, receiving sensor data from sensors associated with the AV, determining, based on the sensor data, an orientation of the user in the AV and a location of the AV relative to a final destination of the user, generating a recommendation for how to exit the AV at the drop-off location based on the orientation of the user in the AV and the location of the AV relative to the final destination of the user, and providing the recommendation via a display, a speaker, a light-emitting device, and/or a client device, the recommendation including a visual indication of an exit direction or an AV door to use to exit the AV, audio instructions for exiting the AV, and/or visual exit instructions.

20 Claims, 12 Drawing Sheets

(51) Int. Cl.
  *G06Q 50/30* (2012.01)
  *B60N 2/00* (2006.01)
  *G01C 21/36* (2006.01)
  *G08G 1/00* (2006.01)
  *G01C 21/20* (2006.01)
  *G05D 1/00* (2006.01)
  *G05D 1/02* (2020.01)

(52) U.S. Cl.
  CPC ....... *G01C 21/3661* (2013.01); *G05D 1/0088* (2013.01); *G05D 1/0246* (2013.01); *G05D 1/0257* (2013.01); *G05D 1/0278* (2013.01); *G06Q 50/30* (2013.01); *G08G 1/202* (2013.01); *G05D 2201/0213* (2013.01)

(58) Field of Classification Search
  USPC .......................................................... 701/23
  See application file for complete search history.

(56) References Cited

U.S. PATENT DOCUMENTS

| | | | |
|---|---|---|---|
| 2018/0196415 A1* | 7/2018 | Iagnemma | G01C 21/3438 |
| 2018/0201187 A1 | 7/2018 | Yellambalase et al. | |
| 2018/0202822 A1* | 7/2018 | DeLizio | G06Q 30/0645 |
| 2018/0354411 A1 | 12/2018 | Shmueli Friedland et al. | |
| 2019/0197798 A1* | 6/2019 | Abari | G06Q 10/02 |

OTHER PUBLICATIONS

International Preliminary Report on Patentability for the application No. PCT/US2019/068319, dated Jan. 6, 2022, 8 pages.

\* cited by examiner

AUTONOMOUS VEHICLE RIDER DROP-OFF TO DESTINATION EXPERIENCE

TECHNICAL FIELD

The present disclosure generally relates to assisting autonomous vehicle riders reach their destination after drop-off.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

Autonomous vehicles can be implemented by companies to provide self-driving car services for the public, such as taxi or ride-hailing (i.e. ride-sharing) services. The self-driving car services can increase transportation options and provide a flexible and convenient way to transport users between locations. To use a self-driving car service, a user will typically request a ride through an application provided by the self-driving car service. When requesting the ride, the user can define a specific pick-up and drop-off location, which the self-driving car service can use to identify the route of the user and select a nearby autonomous vehicle that is able to provide the requested ride to the user. The self-driving car service can then deploy the autonomous vehicle to pick up and transport the user to the drop-off location. Upon reaching the drop-off location, the user can disembark the vehicle and continue to their final destination.

Unfortunately, the drop-off experience of the user can be confusing and unclear. For example, users are often unsure of where exactly they are being dropped off and how to best egress the vehicle. Upon drop off, users can be left disoriented and unable to efficiently determine the remaining path and walking direction to their final destination. Many times, users will wander around in an effort to orient themselves and find a path to their destination, potentially losing valuable time and energy. In some cases, the user's final destination may be difficult to reach or even unreachable from their final drop-off location.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
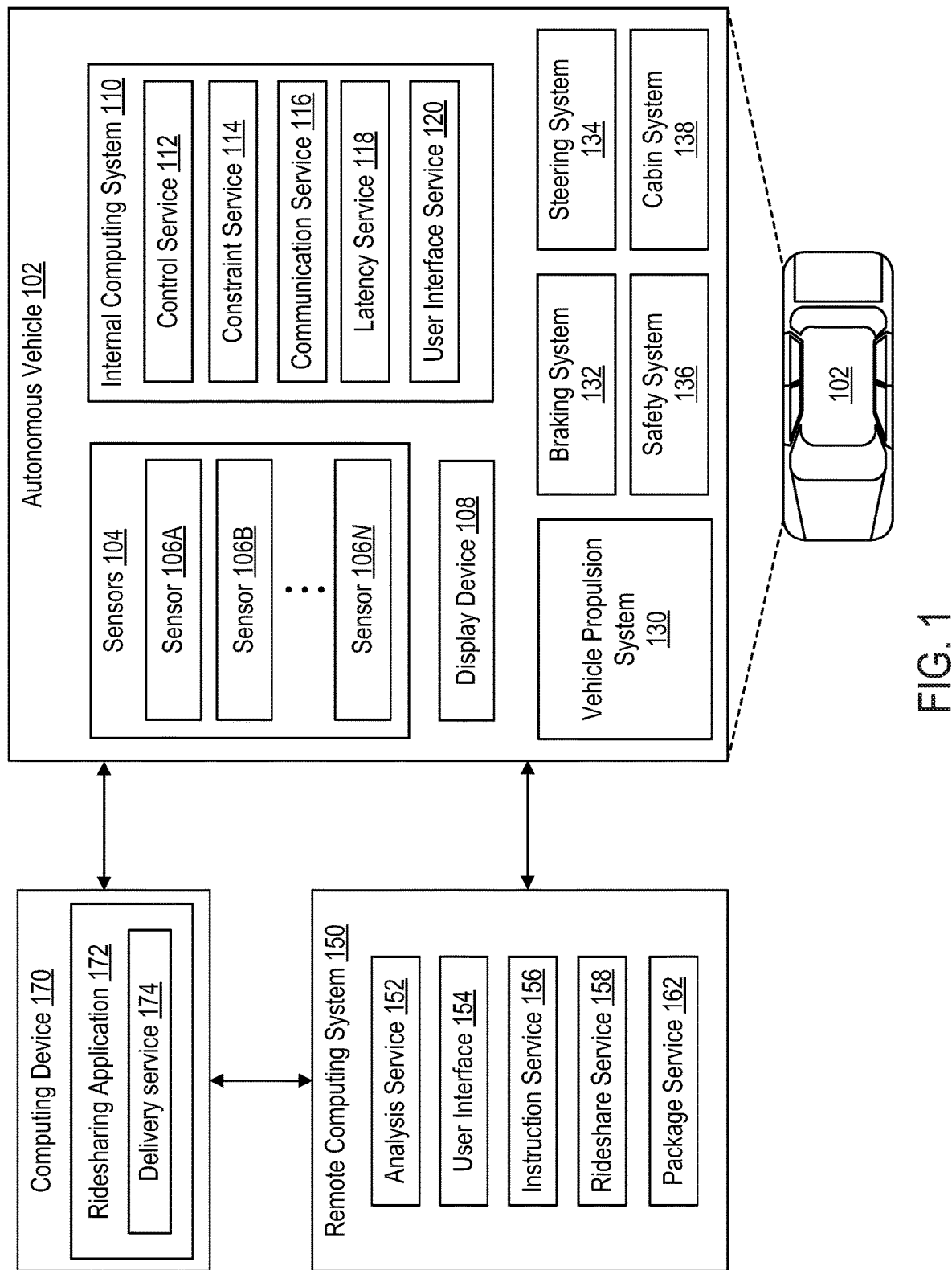
FIG. 1 illustrates an example autonomous vehicle environment including a computing system in communication with an autonomous vehicle, in accordance with some examples.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for intelligent, accurate, and efficient self-driving car service drop off capabilities and wayfinding support. In some aspects, an autonomous vehicle can implement various sensors and devices to understand its surrounding environment and leverage its knowledge of the surrounding environment to find an appropriate drop-off point for riders, assist riders on the best way to exit the vehicle, orient riders upon exiting the vehicle, and guide riders to their final destination. For example, the autonomous vehicle can leverage one or more sensors on the vehicle, such as seat sensors, camera sensors, and inertial measurement units (IMUs), to determine a rider's relative position and guide the rider in exiting the vehicle. The autonomous vehicle can use the rider's relative position and the location of the vehicle to help the rider identify the best way to exit the vehicle, orient the rider upon exiting the vehicle, and guide the rider to their final destination.

The autonomous vehicle can provide visual and/or audio indicators and instructions to help the rider exit the vehicle and reach a final destination. For example, the autonomous vehicle can provide visual and/or audio indicators showing the best egress location on the vehicle and the direction of the rider's final destination. The autonomous vehicle can also provide walking directions to the rider's final destination. The autonomous vehicle can provide the walking directions on an application on the rider's device and/or a display device on the vehicle. In some cases, the autonomous vehicle can provide walking directions through voice instructions and alerts, which can be generated by an audio device on the vehicle and/or routed to a user device such as a mobile phone or listening device (e.g., headphones).

In some cases, the autonomous vehicle can provide the rider with a trip preview, which can include an estimated drop-off location, walking directions to the final destination, an approximate duration of the trip, an approximate walking duration from the drop-off location to the final destination, etc. For example, the autonomous vehicle can render a trip preview on a display device on the vehicle and/or an application on a mobile device of the rider. The autonomous vehicle can also provide a handoff of data and features, such as visual or audio instructions, between the autonomous vehicle and an application on a mobile device of the rider. In some cases, the autonomous vehicle can also provide augmented reality (AR) wayfinding experiences to the rider, in order to guide or assist the rider in reaching the final destination. The autonomous vehicle can provide the AR wayfinding experience to the rider through one or more devices on the vehicle and/or an application on a rider's device.

FIG. 1 illustrates an example autonomous vehicle environment 100. The example autonomous vehicle environment 100 includes an autonomous vehicle 102, a remote computing system 150, and a ridesharing application 172 on a computing device 170. The autonomous vehicle 102, remote computing system 150, computing device 170 (including ridesharing application 172) can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The autonomous vehicle 102 can also use one or more of the sensors 104-108 to determine or track a vehicle occupancy, a seat belt engagement status, the position and/or orientation of any riders in the autonomous vehicle 102, the identity of an object on the vehicle, and/or any other rider or occupancy information. The sensors 104-108 on the autonomous vehicle 102 can include one or more types of sensors and can be arranged about the autonomous vehicle 102.

For example, the sensors 104-108 can include, without limitation, one or more inertial measuring units (IMUs), one or more image sensors (e.g., visible light image sensors, infrared image sensors, video camera sensors, etc.), one or more light emitting sensors (e.g., one or more lasers, one or more light detection and ranging sensors (LIDARs), etc.), one or more global positioning system (GPS) devices, one or more radars, one or more sonars, one or more accelerometers, one or more gyroscopes, one or more magnetometers, one or more motion detection sensors, one or more light detectors, one or more audio sensors (e.g., one or more microphones), one or more seat occupancy sensors, one or more seat belt tension or engagement sensors, etc. In some implementations, sensors 104 can include one or more radars, sensors 106 can include one or more image sensors, and sensors 108 can include one or more seat and/or seat belt sensors. Other implementations can include any other number and types of sensors.

The autonomous vehicle 102 can include one or more display devices 108 for presenting information, such as maps, messages, and interfaces, to passengers in the autonomous vehicle 102. The one or more display devices 108 can be mounted on one or more locations in the autonomous vehicle 102. For example, the one or more display devices 108 can be mounted on one or more seats or headrests in the autonomous vehicle 102, a dashboard in the autonomous vehicle 102, one or more inner sides or door panels on the autonomous vehicle 102, a roof of the autonomous vehicle 102, and/or any other interior location of the autonomous vehicle 102. The one or more display devices 108 can include, for example and without limitation, a screen, a television, a projecting device, and/or any other suitable display device for rendering graphical information.

Moreover, the autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, display devices, light-emitting devices, audio systems, etc.

The autonomous vehicle 102 can include an internal computing system 110 in communication with the sensors 104-108 and the systems 130, 132, 134, 136, and 138. The internal computing system 110 can include one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 206, the braking system 208, the steering system 210, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface system that provides cellular (long-term evolution (LTE), $3^{rd}$ Generation (3G), $5^{th}$ Generation (5G), etc.) communication, Bluetooth communication, near-field communication, and/or any other suitable type of wireless communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to, or receive an instruction from, the autonomous vehicle 102 regarding destinations, requested routes, drop-off locations, wayfinding tasks, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing device 170. Computing device 170 can include, for example and without limitation, a tablet computer, a laptop computer, a smartphone, a head-mounted display (HMD), a gaming system, a server, a smart device, a laptop computer, a smart wearable, and/or any other computing device. In some cases, the computing device 170 can be a passenger or client computing device. Moreover, in some cases, the remote computing system 150 and the autonomous vehicle 102 can also communicate and interact with other computing devices hosting instances of the ridesharing application 172 and the delivery service 174. For example, the remote computing system 150 and the autonomous vehicle 102 can also communicate and interact with other computing devices associated with one or more passengers.

The rideshare service 158 can receive requests from passenger ridesharing application 172, such as user requests to be picked up or dropped off, and can dispatch autonomous vehicle 102 for a requested trip. The rideshare service 158 can also act as an intermediary between the ridesharing application 172 and the autonomous vehicle 102. For example, rideshare service 158 can receive from a passenger instructions for the autonomous vehicle 102, such as instructions to go around an obstacle, change routes, select a drop-off location, honk the horn, etc. The rideshare service 158 can provide such instructions to the autonomous vehicle 102 as requested.

The remote computing system 150 can also include a package service 162 configured to interact with the computing device 170, the ridesharing application 172 and/or a delivery service 174 of the ridesharing application 172. A user operating the ridesharing application 172 can interact with the delivery service 174 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 174 to provide a package identifier to the user for package labeling and tracking. Package delivery service 174 can also inform a user of where to bring their labeled package for drop off. In some examples, a user can request the autonomous vehicle 102 come to a specific location, such as the user's location, to pick up the package. While delivery service 174 has been shown as part of the ridesharing application 172, it will be appreciated by those of ordinary skill in the art that delivery service 174 can be its own separate application.

One example beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
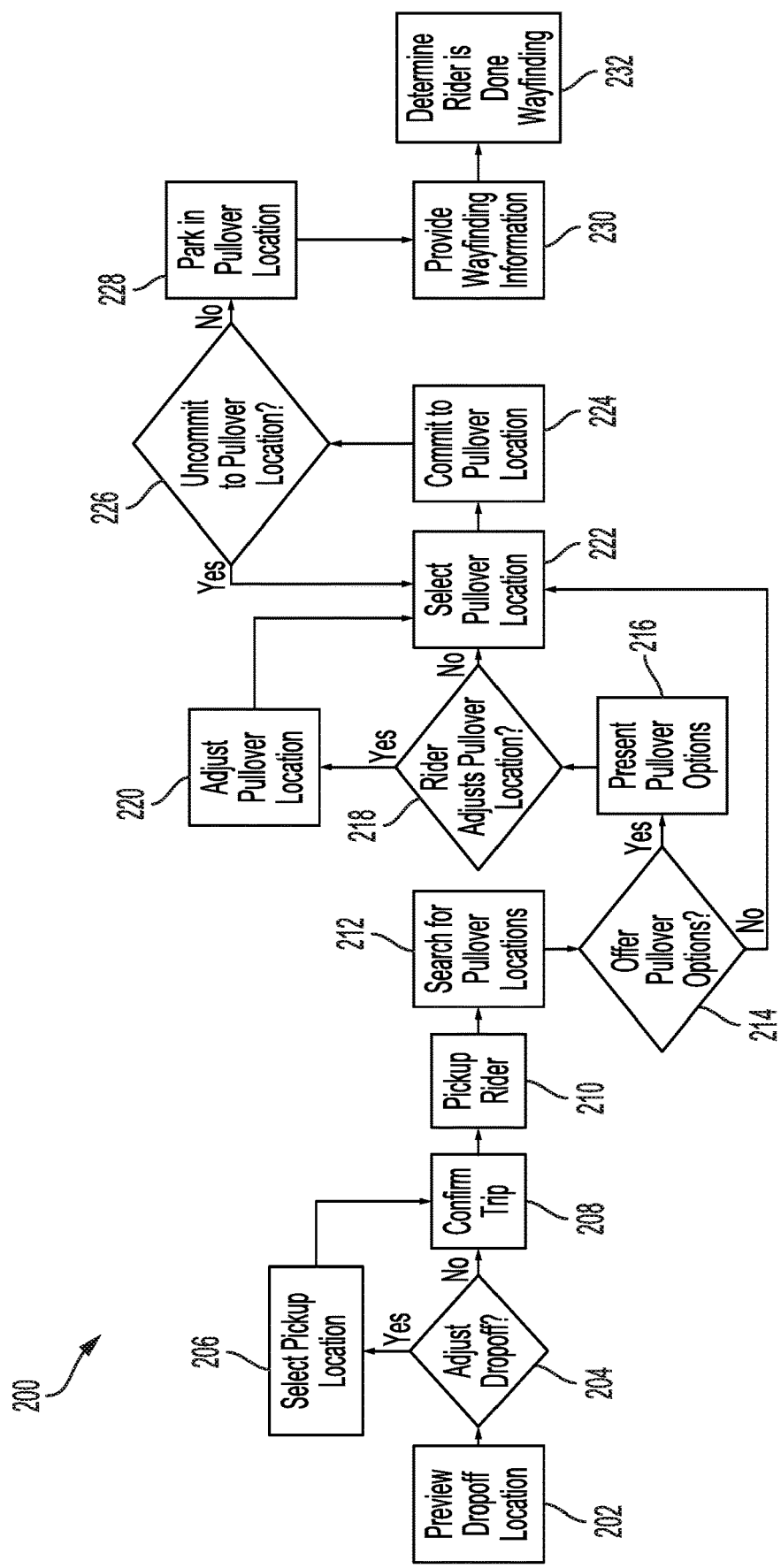
FIG. 2 illustrates an example flow for providing drop-off and wayfinding experiences to passengers of an autonomous vehicle, in accordance with some examples.

FIG. 2 illustrates an example flow 200 for providing drop-off and wayfinding experiences to passengers of the autonomous vehicle 102. In this example, after requesting a ride service through the ridesharing application 172, at block 202, a user is presented (e.g., by the internal computing system 110 or the remote computing system 150) with a preview of one or more drop-off location options for the requested trip. The preview can be presented to the user on the ridesharing application 172, which the user can access through a client device 170, such as a mobile phone. The preview can include a map showing a route to the requested destination for the trip and one or more drop-off points displayed on the map and/or the ridesharing application 172.

In some cases, the one or more drop-off points can include a suggested or default drop-off point. The one or more drop-off points can also include any other drop-off options that the user can select if the user prefers a different drop-off point than the suggested or default drop-off point. In other cases, the one or more drop-off points can include various, unselected drop-off options which the user can choose from for the trip.

At block 204, the flow 200 can include determining (e.g., via the internal computing system 110 and/or the remote computing system 150) whether the user has adjusted the drop-off location for the trip. If the user has adjusted the drop-off location, at block 206, the flow 200 can include selecting (e.g., via the internal computing system 110 and/or the remote computing system 150) a new drop-off location based on the user's adjusted drop-off location. The flow 200 can then proceed to block 208, described below.

If the user has not adjusted the drop-off location, at block 208, the user is presented (e.g., at the ridesharing application 172) with an option to confirm the trip, including the current trip details. The trip details can include the pick-up location, the pick-up time, the trip destination, the selected drop-off location, and any other trip settings or preferences.

At block 210, the autonomous vehicle 102 can then pick up the user at the configured pick-up location. Once the user is picked up by the autonomous vehicle 102, the autonomous vehicle 102 can transport the user to the destination defined for the trip. In some cases, as the user waits for the autonomous vehicle 102 before being picked up, the user can be provided an interface, such as a map, that tracks the autonomous vehicle 102. For example, the user can be presented (e.g., via ridesharing application 172) a map tracking the status, location, and progress of the autonomous vehicle 102.

In some cases, as the user waits for the autonomous vehicle 102, the user can also be presented details and/or statistics associated with the autonomous vehicle 102. For example, the user can be presented an estimated time of arrival of the autonomous vehicle 102, a current distance between the autonomous vehicle 102 and the pick-up location, an alert or notification of any changes in the status of the autonomous vehicle 102 and/or the pick-up details (e.g., a delay notification, a re-routing alert, etc.), and/or any other relevant information.

As the autonomous vehicle 102 approaches the destination of the trip, at block 212, the autonomous vehicle 102 can search for pull-over locations. The autonomous vehicle 102 can identify pull-over locations based on the destination location defined in the trip request, the current road and traffic conditions, the available of locations for the autonomous vehicle 102 to stop and park to allow the user to exit the vehicle, the proximity of the available pull-over locations to the ultimate destination of the user, the respective difficulty of a path or route between each available pull-over location and the ultimate destination (e.g., walking time; obstacles along the path such as traffic and highways; walking distance; exposure to environment conditions along the path such as noise, danger and weather conditions; a type of landscape along the path; a time of day; dangers along the path such as lighting conditions and potential exposure to crime, etc.), accessibility to one or more areas along a path or route between each available pull-over location and the ultimate destination, and/or any other factors.

If the autonomous vehicle 102 identifies multiple pull-over locations, at block 214 the autonomous vehicle 102 can offer (e.g., using the internal computing system 110 and/or the remote computing system 150) multiple pull-over options (e.g., locations) to the user. If the autonomous vehicle 102 does not identify or offer multiple pull-over locations to the user, the flow 200 can proceed to block 222, where the autonomous vehicle 102 selects a location to pull over.

If the autonomous vehicle 102 does offer multiple pull-over options to the user, at block 216 the autonomous vehicle 102 can present (e.g., via the internal computing system 110 and/or the remote computing system 150) the various pull-over options to the user. In some examples, the autonomous vehicle 102 can present the various pull-over options to the user on display device 108 and/or the ridesharing application 172. The user can select a pull-over location from the pull-over options presented to the user.

At block 218, the autonomous vehicle 102 can determine (e.g., using the internal computing system 110 and/or the remote computing system 150) whether the user has adjusted the pull-over location for the trip (e.g., based on a selected pull-over option from the various pull-over options presented to the user). If the user has not adjusted the pull-over location, the flow 200 can proceed to block 222, where the autonomous vehicle 102 selects the pull-over location where the user can exit the vehicle. Alternatively, at block 220 the autonomous vehicle 102 can adjust the pull-over location based on a determination that the user has requested to adjust the pull-over location. The flow 200 can then proceed to block 222, where the adjusted pull-over location is selected as the drop-off point for the user.

After selecting the pull-over location, at block 224, the autonomous vehicle 102 can commit to pulling over at the pull-over location. At block 226, if the user or autonomous vehicle 102 un-commits to the pull-over location, the flow 200 can return to block 222, where a pull-over location is again selected. Otherwise, the flow 200 can proceed to block 228.

At block 228, the autonomous vehicle 102 can park at the pull-over location to allow the user to exit the vehicle. At block 230, the autonomous vehicle 102 can provide (e.g., through the internal computing system 110 and/or the remote computing system 150) wayfinding information to the user. The autonomous vehicle 102 can provide the wayfinding information before and/or after the user exits the vehicle. Moreover, the autonomous vehicle 102 can provide the wayfinding information visually and/or by audio. For example, the autonomous vehicle 102 can visually present to the user some or all of the wayfinding information on the display device 108 and/or the ridesharing application 172. As another example, the autonomous vehicle 102 can provide some or all of the wayfinding information through audio utterances or messages (e.g., via a speaker on the autonomous vehicle 102 and/or the user's device).

The wayfinding information can include, for example and without limitation, an indication of which door/side the user should use to exit the vehicle (e.g., to avoid traffic or obstacles, to leave the user in the best place to continue to the final destination, etc.), an indication of which direction the user should go to reach the final destination, walking instructions or directions for reaching the final destination, a map illustrating a preview or path for walking from the user's location to the final destination, an estimated time of arrival to the final destination, a distance to the final destination, an amount of time estimated to take the user to reach the final destination, a notification alerting the user of any conditions or events (e.g., a change in course or walking direction, an obstacle or safety hazard, a deviation by the user from a specific path, etc.), one or more options or alternative paths or modes of travel for reaching the final destination, etc.

In some cases, a handoff between the autonomous vehicle 102 (e.g., the internal computing system 110 on the autonomous vehicle 102) and the user's device (e.g., 170) can be established when the user exits the vehicle or when the user is a certain distance away from the autonomous vehicle 102, to allow the user to continue to receive or access the wayfinding information as the user continues on to the final destination after exiting the vehicle. The handoff can be established wirelessly via, for example, a cellular network, a WIFI network, or any other suitable wireless network.

To illustrate, in some examples, the autonomous vehicle 102 can provide wayfinding information to the user while the user is on the vehicle (e.g., via display device 108, one or more sensors 104, a speaker device, etc.). When the user exits the autonomous vehicle 102 (or is at a relative proximity after exiting the vehicle), a handoff can be established between the user's device (e.g., 170) and the autonomous vehicle 102 (or the device(s) used to provide the wayfinding information while the user is on the vehicle). The user can thus continue receiving the wayfinding information (e.g., via the user's device 170) after exiting the vehicle and as the user continues to the final destination (e.g., by walking, via a bicycle, via a motor bike, via a public transportation system such as bus or trolley, etc.).

In some cases, the autonomous vehicle 102 can route (e.g., via the internal computing system 110 and/or the remote computing system 150) audio with wayfinding information to the user's device (e.g., 170) and/or a listening device associated with the user (e.g., headphones). This way, the user can listen to wayfinding information (e.g., audio cues) through the user's listening device as the user continues on to the final destination. Moreover, in some cases, the autonomous vehicle 102 can provide the user visual cues to help orient the user when, or after, exiting the vehicle. For example, the autonomous vehicle 102 can activate a light alerting the user of which side or door the user should use to exit the vehicle. In another example, the autonomous vehicle 102 can use an external light to provide the user a visual cue of which direction the user should go when walking or moving towards the final destination. The autonomous vehicle 102 can also use the external light to alert the user if the user is moving in the wrong direction.

The autonomous vehicle 102 can use the sensors 104 to track the user's position inside the vehicle and after exiting the vehicle in order to providing such alerts and wayfinding information to the user. For example, the autonomous vehicle 102 can use a camera sensor (e.g., 106A), a LIDAR (e.g., 106B), and/or a radar (e.g., 106N) to determine the user's current location/position and/or moving direction. If the user is walking in the wrong direction, the autonomous vehicle 102 can detect so based on the determined user location/position and/or moving direction and provide the user a visual and/or audio cue alerting the user that the user is walking in the wrong direction and/or indicating the correct direction towards the final destination.

Once the user has reached the final destination, at block 232, the autonomous vehicle 102 can determine that the user is done wayfinding. In some examples, the autonomous vehicle 102 (e.g., the internal computing system 110 and/or the remote computing system 150) can track the user (e.g., via the ridesharing application 172, the sensors 104, etc.) to determine where the user is located and/or whether the user has reached the final destination. In some cases, the user can also communicate with the autonomous vehicle 102 (e.g., with the internal computing system 110 and/or the remote computing system 150) to provide status updates (e.g., report a location, report a change of course, report that the user has reached the final destination, etc.), request help, end the wayfinding assistance provided by the autonomous vehicle 102, and/or provide any other information or request. The user can conduct such communications using, for example, the ridesharing application 172.

Figure 3B:
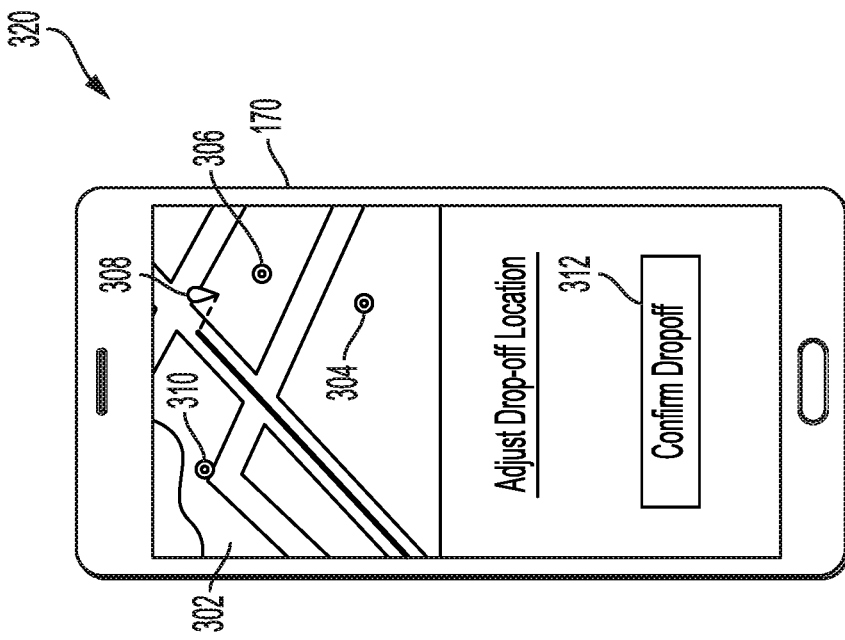
FIG. 3B illustrates an example interface for allowing a user to adjust a drop-off location of a user trip on an autonomous vehicle, in accordance with some examples.
Figure 3A:
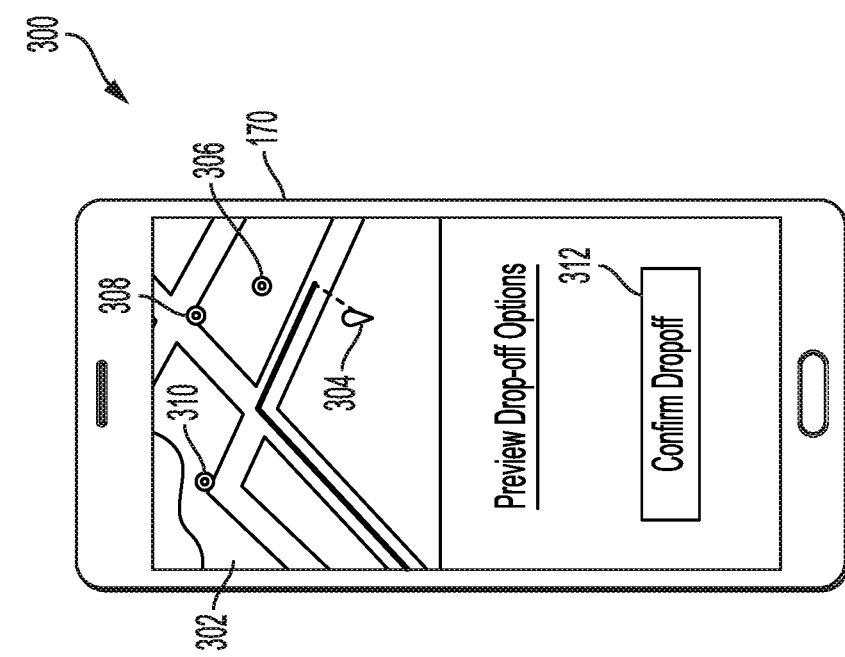
FIG. 3A illustrates an example interface for presenting a preview of drop-off options for a user trip on an autonomous vehicle, in accordance with some examples.

FIG. 3A illustrates an example interface 300 for presenting a preview of drop-off options 304-310 for a trip requested by a user. The interface 300 can be presented on a client device 170 associated with the user sometime after the user requesting a ride from an autonomous vehicle 102. In some examples, the interface 300 can be presented on a ridesharing application 172 on the user's client device 170. In other examples, the interface 300 can be presented on a different application on the user's client device 170, such as a web browser.

The interface 300 can display a map 302 showing the different drop-off options 304-310 in their respective locations on the map 302. In some cases, the drop-off options 304-310 can include a drop-off option (e.g., 304) that has been selected or suggested for the user based on one or more factors such as, for example and without limitation, a proximity to a final destination of the user, a relative direction or orientation between the drop-off option and the final destination of the user, a surrounding environment and/or conditions (e.g., traffic, access to areas within a path to the final destination of the user, sidewalk availabilities, user preferences, ease of access, exposure to weather or other environment conditions, etc.). In other cases, the drop-off options may not include a pre-selected or suggested drop-off option. Here, the interface 300 may simply present the drop-off options 304-310 and allow the user to select a preferred drop-off option.

In the example shown in FIG. 3A, drop-off option 304 is depicted as a selected drop-off location for the trip. Here, the drop-off option 304 can be predetermined or suggested drop-off location for the user as previously explained, or a drop-off location selected by the user. The interface 300 can also display an interface element 312 for confirming the drop-off option 304 currently selected or configured for the trip. The interface element 312 can be a selectable interface element that the user can use to confirm the drop-off option. If the user does not wish to confirm the drop-off option 304 currently configured or selected for the trip, the user may simply select a different drop-off option (e.g., 306, 308, or 310) before selecting the interface element 312 for confirming the drop-off option.

Once the user selects the interface element 312, the drop-off option 304 currently selected can be set as the drop-off location for the trip. If the autonomous vehicle 102 later determines that the drop-off location should be changed or that better options are available for the trip (e.g., based on changing circumstances such as weather, construction, or traffic changes), the autonomous vehicle 102 may determine a different drop-off location or provide the user an opportunity to select a different drop-off location. In some examples, the user may also later adjust the drop-off location from the user's client device 170.

For example, with reference to FIG. 3B, the user can be presented an interface 320 for adjusting the drop-off location. The interface 320 can be displayed on the user's client device 170 through an application, such as the ridesharing application 172, as previously described with respect to interface 300.

The interface 320 can similarly include the map 302 with the drop-off options 304-310 identified for the user's trip. In this example, the drop-off location has been adjusted from drop-off option 304 to drop-off option 308. The drop-off location may be adjusted for one or more reasons such as, for example, changes in circumstances (e.g., traffic, weather, construction or other obstructions, user preference, street closures, nearby events, etc.). If the user does not have further adjustments to make, the user can confirm the adjusted drop-off location through the interface element 312.

Figure 4B:
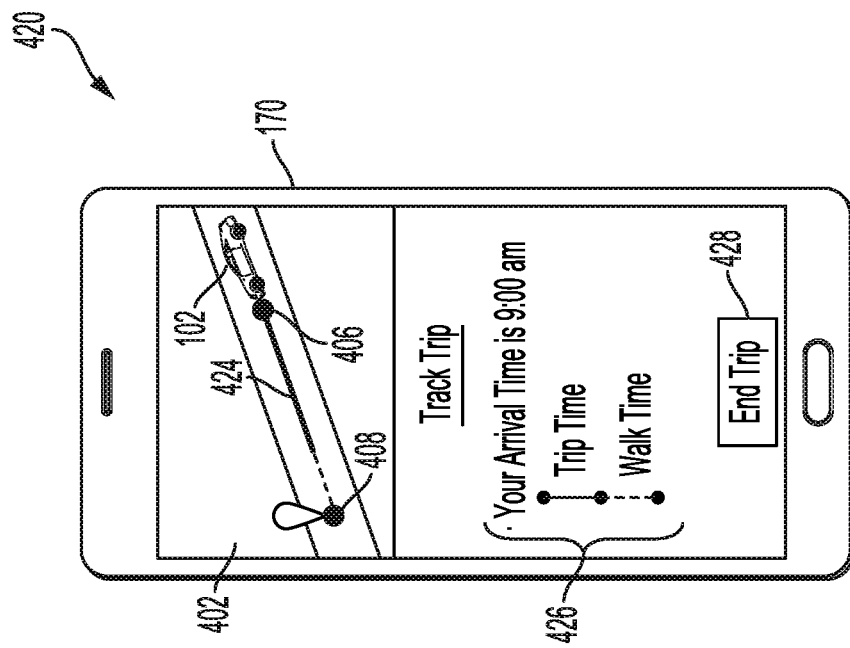
FIG. 4B illustrates an example tracking interface for allowing a user to track an autonomous vehicle and a progress of a requested trip, in accordance with some examples.
Figure 4A:
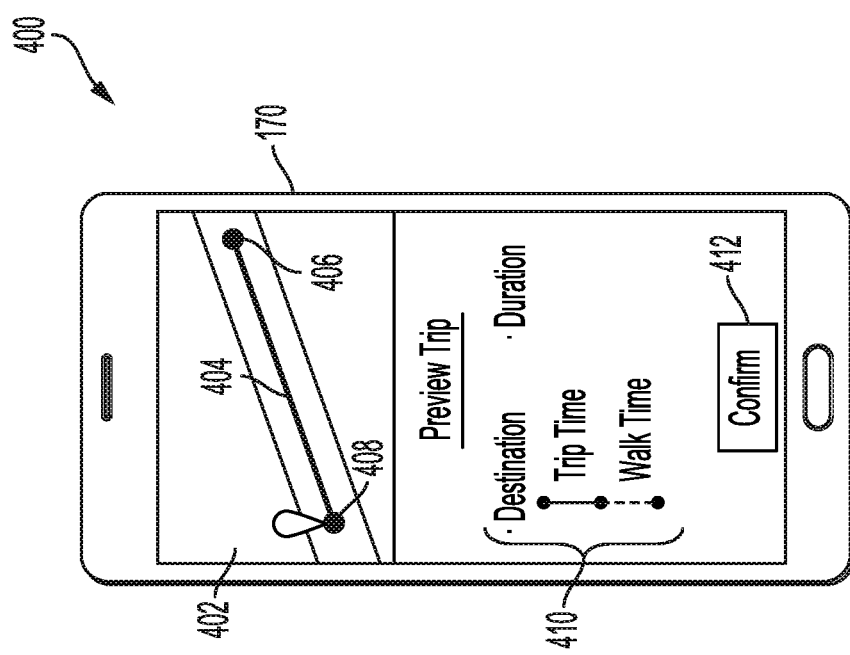
FIG. 4A illustrates an example trip preview interface on a user's client device, in accordance with some examples.

FIG. 4A illustrates an example trip preview interface 400 on a user's client device 170. The trip preview interface 400 can include a map 402 showing a preview of a route 404 calculated or selected for a requested trip. The route 404 can display the path of the autonomous vehicle 102 from a pick-up location 406 to a drop-off location 408 associated with the trip. The trip preview interface 400 can also display a details section 410 presenting specific details associated with the route 404 and/or trip.

In some examples, the details section 410 can present an indication of the final destination of the user, an indication of an estimated duration of the trip (e.g., calculated based on the route 404 and any other factors such as traffic, time of day, nearby conditions, etc.), a current time, an estimated drop-off time, a traveling distance from the pick-up location 406 to the drop-off location 408 and/or the final destination, etc. In some cases, the details section 410 can present an estimated duration of the ride in the autonomous vehicle and an amount of time that is estimated to take the user to walk (or travel via any other mode) from the drop-off location 408 to the final destination.

The trip preview interface 400 can also display an interface element 412 which the user can select to confirm the trip and associated details. For example, if the user agrees with the trip preview and details presented in the trip preview interface 400, the user can select the interface element 412 to confirm the trip. Once the user has confirmed the trip, an autonomous vehicle 102 can be dispatched to pick up the user at the pick-up location 406 and take the user to the drop-off location 408 based on the confirmed trip details/settings.

Once the autonomous vehicle 102 is dispatched for the trip, the user can track the autonomous vehicle as it travels to the pick-up location 406. With reference to FIG. 4B, the user's client device 170 can display a tracking interface 420 to track the autonomous vehicle 102 and the progress of the trip. In some examples, the autonomous vehicle can communicate (e.g., via the internal computing system 110 and/or the remote computing system 150) tracking information (e.g., information presented in the tracking interface 420 and/or any updates) to the client device 170, which the client device 170 can use to display and/or update the tracking interface 420. The client device 170 can present the tracking interface 420 in an application such as, for example, the ridesharing application 172.

The tracking interface 420 can include a map 402 showing a current location 422 of the autonomous vehicle 102 along a pick-up route 424 to the pick-up location 406. The tracking interface 420 can also present tracking details 424 such as, for example, an estimated arrival time (e.g., to the pick-up location 406, the drop-off location, and/or the final destination), a trip duration, an amount of time estimated to take the user to travel (e.g., by walking or any other mode) from the drop-off location to the final destination, etc.

In some cases, the tracking interface 420 can also include an interface element 428 that the user can select to end or cancel the trip. For example, the user can track the autonomous vehicle 102 through the tracking interface 420 and view tracking details. If the user decides to end or cancel the trip, the user can select the interface element 428, which would trigger a request or instruction to end or cancel the trip. The client device 170 can send a signal (e.g., via a network such as a cellular or WIFI network) to the autonomous vehicle 102 (e.g., to the internal computing system 110 and/or the remote computing system 150) indicating that the user has ended or canceled the trip.

If the user does not end or cancel the trip, the autonomous vehicle 102 can continue and pick up the user. Once the user is picked up by the autonomous vehicle 102, the autonomous vehicle 102 can travel towards the drop-off location configured for the trip. As the autonomous vehicle 102 is close to or begins to approach the end of the trip (e.g., the drop-off location), the autonomous vehicle 102 can search for a convenient pull-over location. In some cases, the autonomous vehicle 102 can provide the user one or more pull-over options.

Figure 5B:
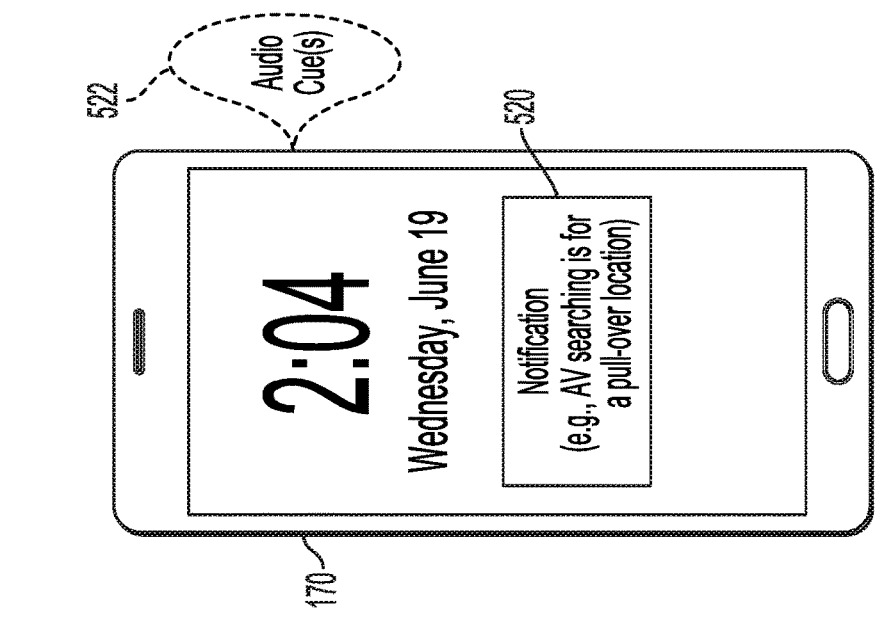
FIG. 5B illustrates an example notification sent to a user's client device to inform a user in an autonomous vehicle that the autonomous vehicle is searching for a pull-over location, in accordance with some examples.
Figure 5A:
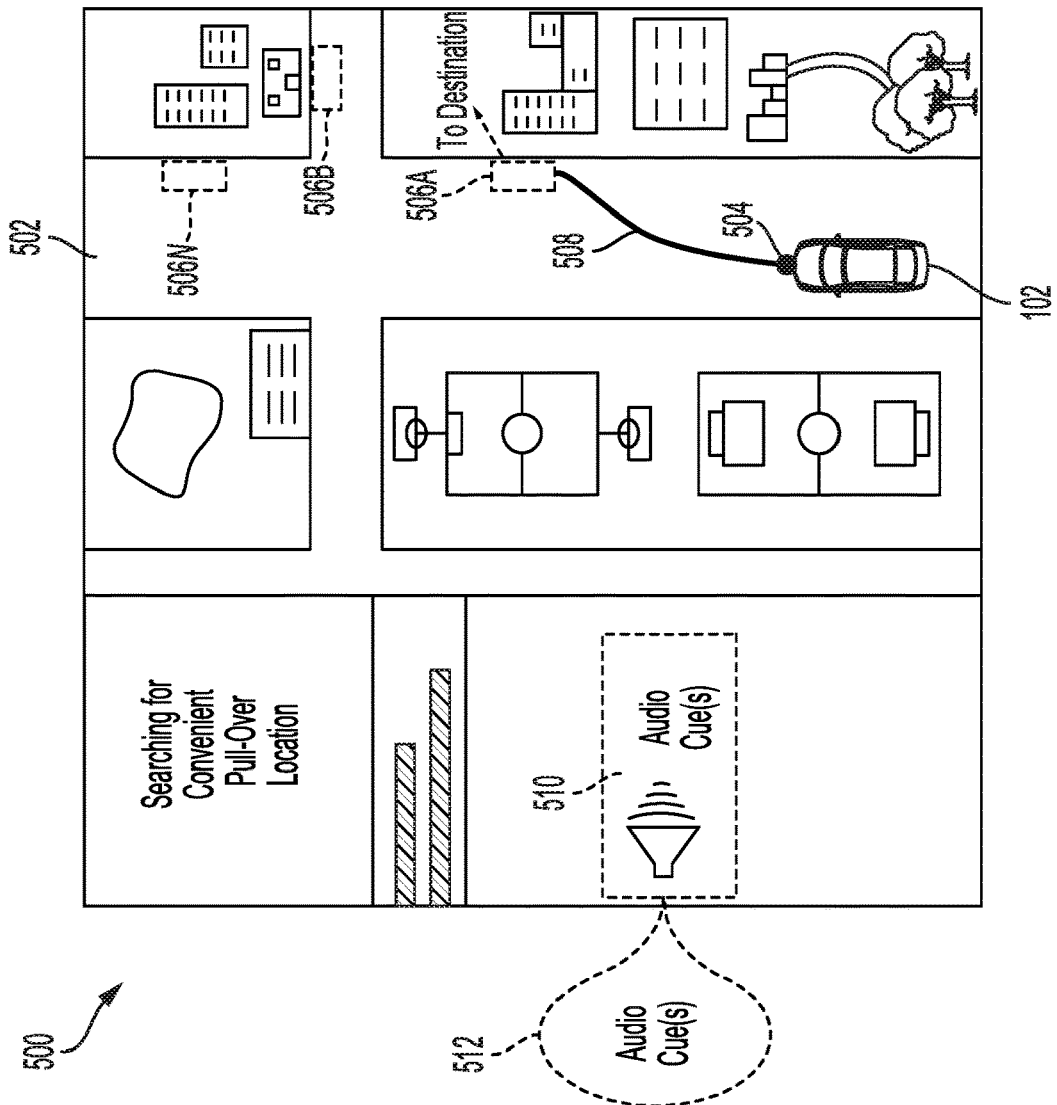
FIG. 5A illustrates an example interface for presenting pull-over options for dropping off a user in an autonomous vehicle at or near a selected drop-off location, in accordance with some examples.

FIG. 5A illustrates an example interface 500 for presenting pull-over options 506A-N for dropping off the user at or near the drop-off location. In some examples, the autonomous vehicle 102 can present the interface 500 to the user on a display device 108 in the autonomous vehicle 102. In other examples, the autonomous vehicle 102 can provide the interface 500 for presentation on the user's client device 170

(e.g., via an application such as ridesharing application 702). Moreover, in some cases, the autonomous vehicle 102 can provide the interface 500 as the autonomous vehicle 102 searches for a pull-over location and/or before beginning to search for a pull-over location.

The interface 500 can include a map 502 of the area. The map 502 can depict the current location 504 of the autonomous vehicle 102 and an identified pull-over location 506A. The map 502 can also depict a path 508 from the current location 504 of the autonomous vehicle 102 to the identified pull-over location 506A. In some cases, the map 502 can also depict a direction to the final destination of the user from the pull-over location 506A and/or from the general drop-off area.

In some cases, the map 502 can also depict other pull-over options 506B-N for the user. The other pull-over options 506B-N can provide alternatives that the user may select from. If the user prefers one of the other pull-over options 506B-N more than the pull-over location 506A, the user can select a particular pull-over option 506B-N from the map 502 to trigger the autonomous vehicle 102 to drop off the user at the other, selected pull-over option.

In some implementations, the interface 500 can optionally provide an audio option 510 that the user can select to receive audio cues 512 regarding the pull-over options 506A-N and/or any other information related to the trip such as, for example, audio updates, audio instructions for exiting the vehicle and/or walking to the final destination, audio messages describing the pull-over options 506A-N, audio input requests asking the user to select or confirm (e.g., by voice and/or manual input) a particular pull-over option, audio notifications providing status updates, audio messages requesting information from the user, audio messages with wayfinding details, and/or any other information.

FIG. 5B illustrates an example notification 520 sent to the user's client device 170 to inform the user that the autonomous vehicle 102 is searching for a pull-over location. As the autonomous vehicle 102 searches (and/or before) for a pull-over location, the autonomous vehicle 102 can send (e.g., via the internal computing system 110 and/or the remote computing system 150) the notification 520 to the client device 170 for presentation to the user at the client device 170. The notification 520 can indicate that the autonomous vehicle 102 is searching for a pull-over location. In some cases, the notification 520 can also provide other information such as, for example, an indication of one or more pull-over options identified by the autonomous vehicle 102, details about one or more pull-over options, an alert (e.g., a hazard alert, a weather alert, an update alert, etc.), a request to confirm a pull-over location, and/or any other information.

In some cases, if the user has chosen to receive audio cues, the autonomous vehicle 102 can also provide audio cues 522 as previously explained. The client device 170 can output the audio cues 522 for the user via a speaker device on the client device 170 or connected to the client device 170, such as a speaker on the client device 170 or an external speaker device (e.g., headphones) connected to the client device 170.

Figure 6:
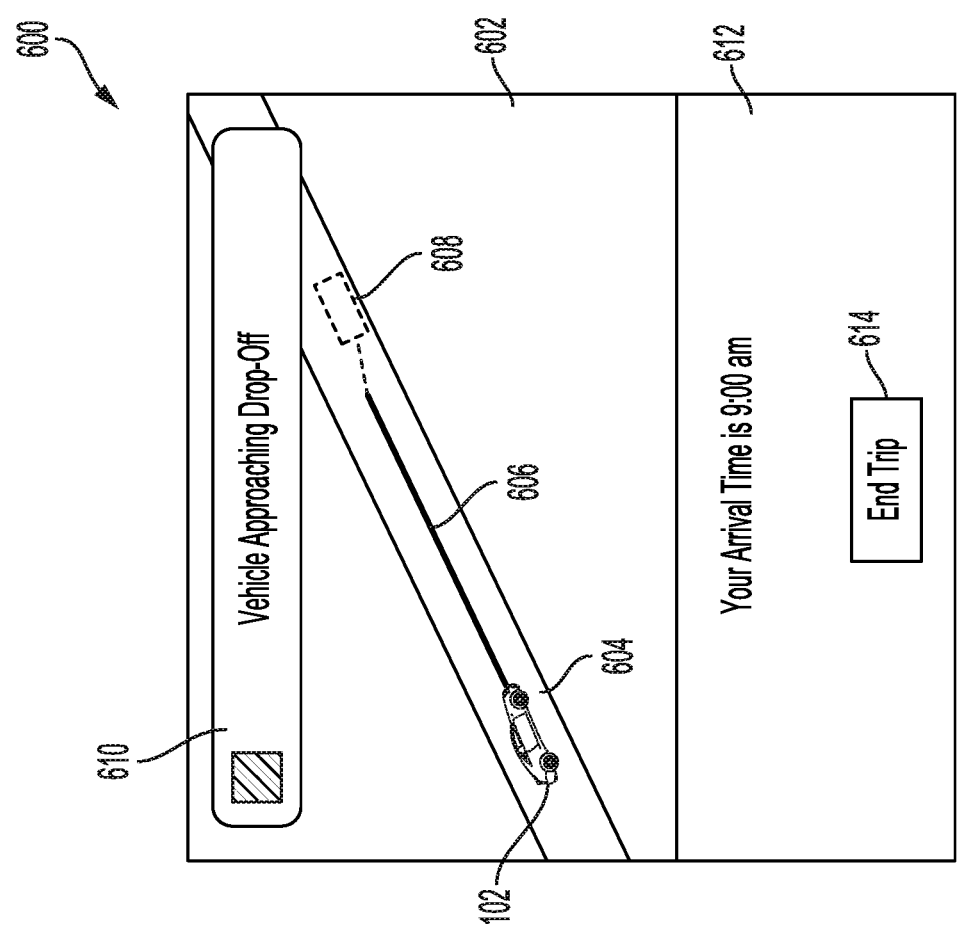
FIG. 6 illustrates an example interface provided to a user in an autonomous vehicle for displaying pull-over information for the user, in accordance with some examples.

Once the autonomous vehicle 102 commits to a pull-over location, the autonomous vehicle 102 can provide the user an indication that the autonomous vehicle 102 has selected and/or is approaching the pull-over location. With reference to FIG. 6, the autonomous vehicle 102 can provide (e.g., via the internal computing system 110 and/or the remote computing system 150) an interface 600 for displaying pull-over information for the user.

In some cases, the autonomous vehicle 102 can present the interface 600 on a display device 108 inside the vehicle prior to dropping off the user. For example, the autonomous vehicle 102 can present the interface 600 on a display (108) on the back of a seat in front of the user's current seating location. The user can thus view and/or interact with the interface 600 from the display device 108 inside of the autonomous vehicle 102. In some cases, the autonomous vehicle 102 can communicate with the user's client device 170 to coordinate or trigger a presentation of the interface 600 on the client device 170. The client device 170 can display the interface 600 in addition to, or in lieu of, the autonomous vehicle 102 presenting the interface 600 on a display device inside the vehicle.

The interface 600 can include a map 602 depicting the current location 604 of the autonomous vehicle 102 and the pull-over location 608 selecting for dropping off the user. The map 602 can depict the path 606 from the current location 604 to the pull-over location 608 to give the user a sense of the distance and/or trajectory from the current location 604 to the pull-over location 608. In some cases, the interface 600 can also display a notification 610 indicating that the autonomous vehicle 102 is approaching drop-off. The notification 610 can inform the user that the trip is near its end, the autonomous vehicle 102 will soon pull-over and the user will soon have to exit the vehicle. This can give the user notice and time to prepare for exiting the vehicle.

The interface 600 can also include a details section 612 which provides information about the trip and/or the end of the trip. For example, the details section 612 can display an estimated arrival time (e.g., arrival to the drop-off and/or the final destination) for the user. In some cases, the details section 612 can provide other information about the trip and/or the environment, such as a duration of the trip, traffic conditions around the area, weather conditions around the area, nearby locations or landmarks, instructions for exiting the vehicle, alerts, etc.

In some implementations, the interface 600 can include an interface element 614 that the user can select to end the trip. For example, the user can select the interface element 614 after (or during) exiting the vehicle in order to finalize the trip.

Figure 7:
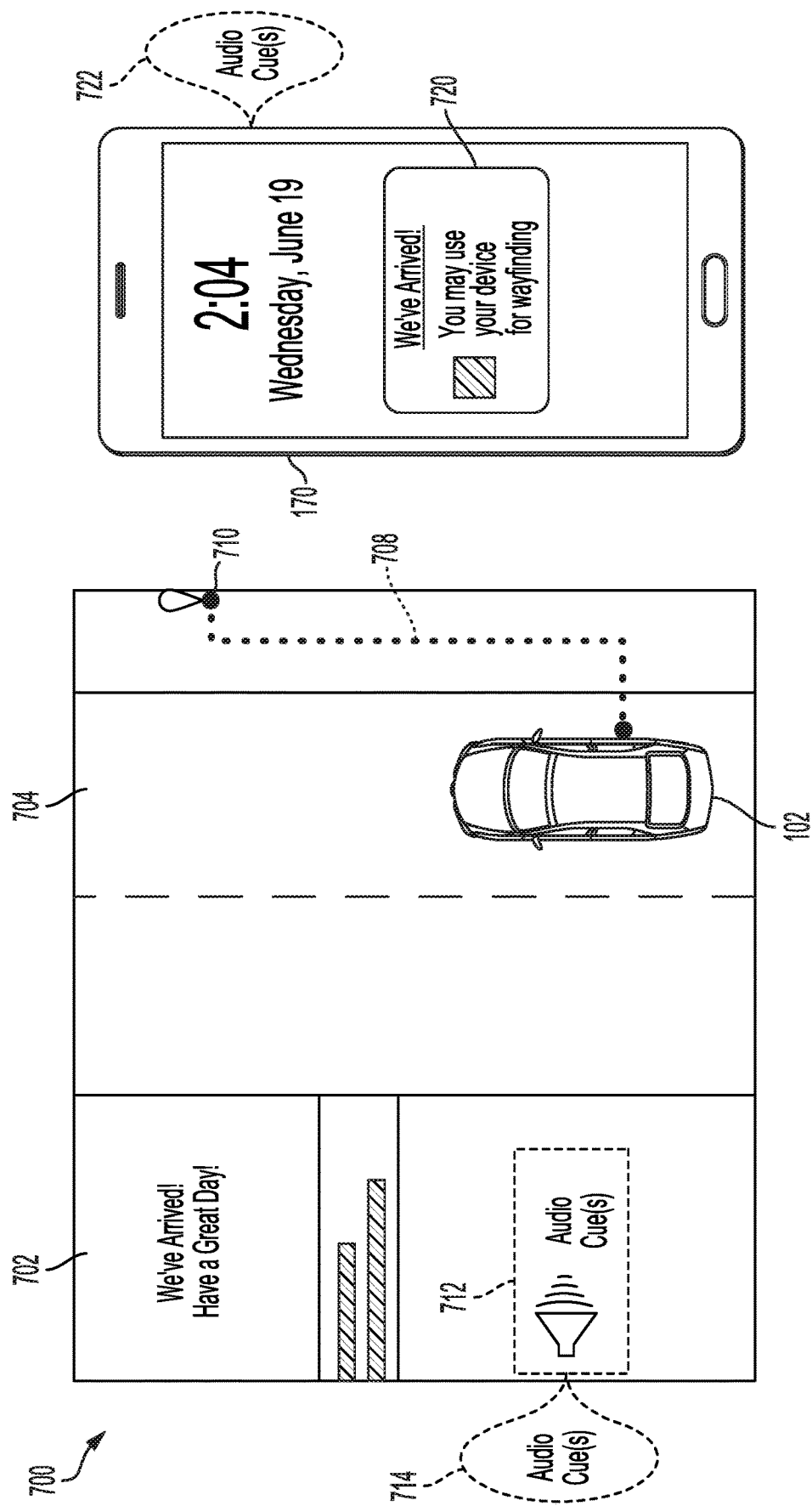
FIG. 7A illustrates an example interface indicating that an autonomous vehicle has reached a pull-over location for a user and providing wayfinding information to the user, in accordance with some examples.
FIG. 7B illustrates an example notification presented on a user's client device to inform the user that the user has arrived at a drop-off location selected for a ride on an autonomous vehicle, in accordance with some examples.

FIG. 7A illustrates an example interface 700 indicating that the autonomous vehicle 102 has reached its pull-over location and providing wayfinding information to the user. The interface 700 can be presented on a display device 108 in the autonomous vehicle 102 when the autonomous vehicle has parked in the pull-over location for the user to exit the vehicle and continue to the user's final destination 710. It is to be understood that the interface 700 may also be presented on the display device 108 prior to parking in the pull-over location, such as a predicted, predetermined length of time prior to parking, so the user may have an opportunity to review their walking route before drop-off.

The interface 700 can include a message 702 notifying the user that the user has arrived at the drop-off location. The interface 700 can also include a map 704 depicting the pull-over location 706 where the autonomous vehicle 102 is parked, and a walking path 708 from the pull-over location 706 to the final destination 710. The map 704 can thus provide the user a preview of the path or route the user can travel after exiting the vehicle to reach the final destination 710 from the pull-over location 706.

The path 708 depicted in the map 704 can include a turn-by-turn preview or instructions. In some cases, the path 708 can also depict other information such as alerts (e.g., obstacle alerts, hazard alerts, traffic alerts, access alerts, weather alerts, etc.), suggestions, alternatives, distance information, time or duration information, etc.

In some cases, the interface 700 can also include an audio option 712 which the user can select to receive audio cues 714. The audio cues 714 can provide audio notifications (e.g., alerts, updates, status notifications, etc.), audio messages with wayfinding information and/or instructions, audio messages with instructions for exiting the vehicle, etc. In some cases, when the user exits the autonomous vehicle 102, a handoff can occur between the autonomous vehicle 102 and the user's client device 170 to continue to provide the audio cues 714 and/or the interface 700 on the client device 170. Thus, the user can continue to view the interface 700 and/or receive the audio cues 714 as the user continues to the final destination 710 after exiting the vehicle.

FIG. 7B illustrates an example notification 720 presented on the user's client device 170 to inform the user that the user has arrived at the drop-off location. The notification 720 can inform the user that the user can use the client device 170 to receive wayfinding information as the user continues to the final destination after exiting the vehicle. In some cases, the user can select the notification 720 to launch an application (e.g., ridesharing application 172) on the client device 170 that can provide wayfinding information provided by the autonomous vehicle (e.g., via the internal computing system 110 and/or the remote computing system 150). For example, when the user clicks on the notification 720, the client device 170 can launch a map with wayfinding information (e.g., turn-by-turn walking instructions) for the user.

In some implementations, the client device 170 can also provide audio cues 722 to the user with wayfinding information, such as turn-by-turn walking directions. In some examples, the audio cues 722 can also provide other information such as alerts, updates, messages, etc.

Figure 8:
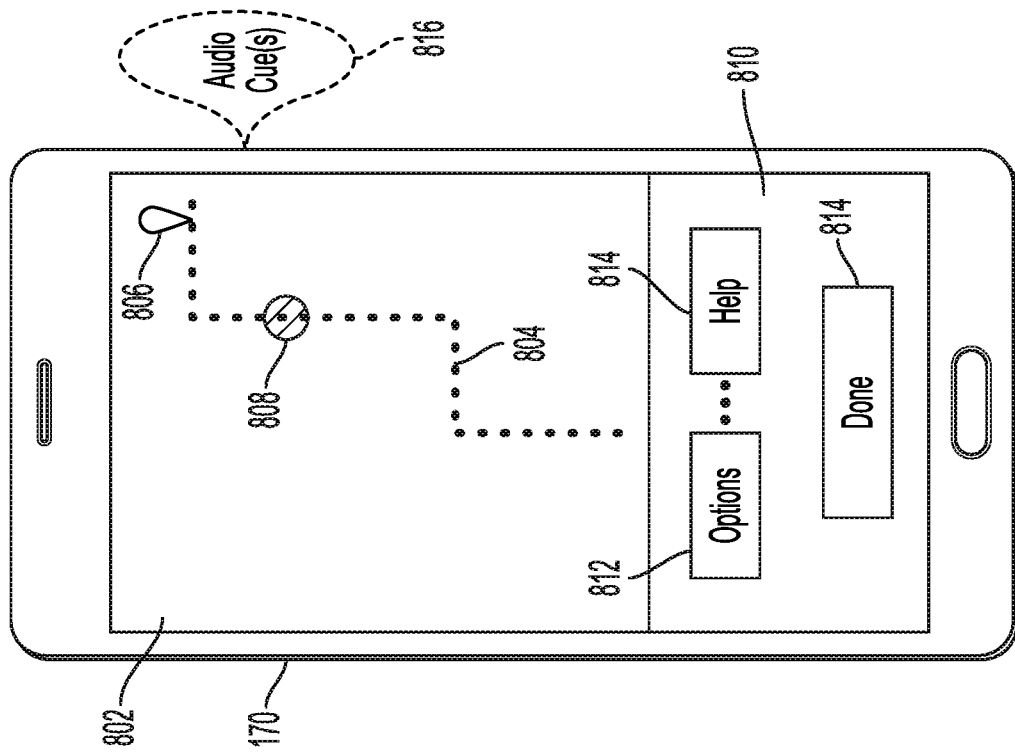
FIG. 8 illustrates an example wayfinding interface provided to a rider of an autonomous vehicle to assist the rider navigate from a drop-off location to a final destination of the rider, in accordance with some examples.

FIG. 8 illustrates an example wayfinding interface 800 which can be provided to assist the user navigate from the drop-off location to the final destination. In some examples, the autonomous vehicle 102 can provide (e.g., via the internal computing system 110 and/or the remote computing system 150) the wayfinding interface 800 to the user's client device 170 for presentation to the user. The user can use the wayfinding interface 800 to navigate to the final destination after exiting the autonomous vehicle 102. The autonomous vehicle 102 can provide the wayfinding interface 800 to the client device 170 before and/or after the user exits the autonomous vehicle 102.

For example, in some implementations, the autonomous vehicle 102 can provide the wayfinding interface 800 to the client device 170 before the user exits the autonomous vehicle 102 to help the user orient herself when exiting the vehicle and/or to allow the user to preview a direction and/or path from the drop-off location to the final destination. In other implementations, the autonomous vehicle 102 can provide the wayfinding interface 800 to the client device 170 after (or while) the user exits the autonomous vehicle 102 to provide wayfinding information to the user in order to help the user reach the final destination after exiting the vehicle.

The wayfinding interface 800 can be rendered by an application on the client device 170, such as the ridesharing application 172 for example. Moreover, the wayfinding interface 800 can include a map 802 illustrating a path 804 to the final destination 806 and a current location 808 of the user (e.g., based on a location of the client device 170) along, or relative to, the path 804. In some cases, the map 802 or wayfinding interface 800 can include other wayfinding information such as, for example, an indication of an estimated time of arrival to the final destination, an indication of a distance from the current location 808 of the user and/or the drop-off location to the final destination, an alternative path, an alert, etc.

The wayfinding interface 800 can also include a section 810 with one or more interface elements 812-816. The interface elements 812-816 can include selectable or interactive interface elements (e.g., buttons, links, etc.) for obtaining or providing additional information and/or functionalities. For example, interface element 812 can be configured to provide additional options when activated/selected by a user. Non-limiting examples of additional options that can be accessed through interface element 812 include alternate paths/routes to the final destination, an option to search for certain landmarks or businesses along (or near) the path 804, an option to request or obtain wayfinding information for a different mode of travel (e.g., walking, riding a bicycle, riding a train, etc.), etc.

As another example, the interface element 814 can provide the user an option to request additional wayfinding help, such as a live person, an answer to one or more questions, etc. Moreover, the interface element 814 can provide the user an option to notify the autonomous vehicle 102 that the user is finished wayfinding and/or to request to end/complete the trip including the wayfinding portion. In other examples, the section 810 can include interface elements for other things such as, for example, defining map and/or wayfinding settings/preferences, providing inputs, adjusting the current location 808 and/or the final destination 806, etc.

In some implementations, the client device 170 can optionally provide audio cues 816 with wayfinding and other information in combination with, or in lieu of, the wayfinding interface 800. The audio cues 816 can be based on audio data or messages provided to the client device 170 by the autonomous vehicle 102 (e.g., via the internal computing system 110 and/or the remote computing system 150).

Figure 9:
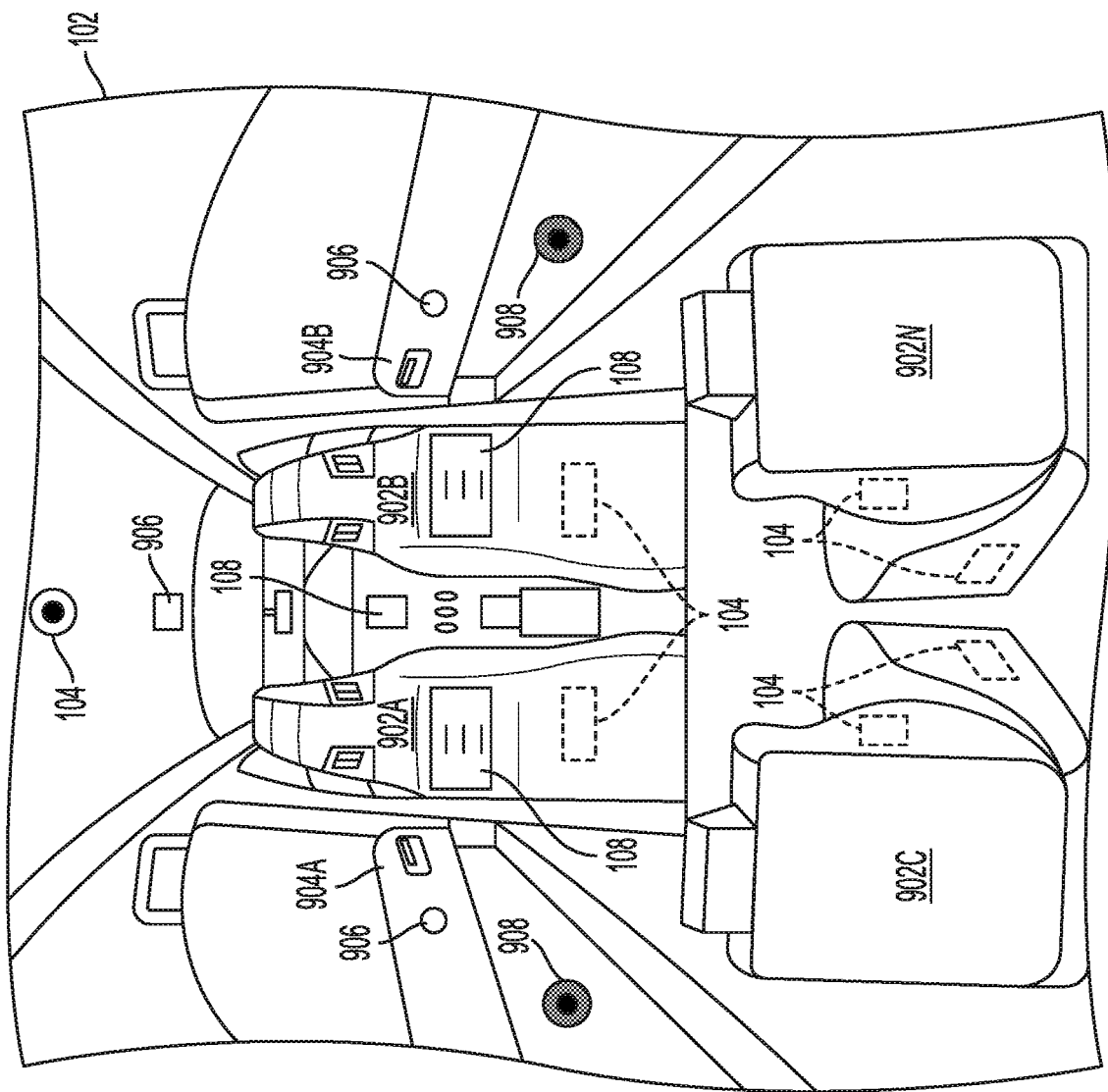
FIG. 9 illustrates an example configuration of an interior of an autonomous vehicle equipped with various components for providing a rider visual and/or audio cues and information during a trip, in accordance with some examples.

FIG. 9 illustrates an example configuration of an interior 900 of an autonomous vehicle 102 equipped with various components (104, 108, 906, and 908) for providing the user visual and/or audio cues and information during a trip. The visual and/or audio cues and information can include, for example and without limitation, trip previews; wayfinding information; instructions for exiting the autonomous vehicle 102 (e.g., when to exit, where to exit, which direction to go when exiting, etc.); suggestions for where to sit in the vehicle to have easy/best access to the optimal egress location (e.g., side and door) calculated for a particular drop-off location; suggestions for sitting arrangements of multiple users in view of their respective egress locations; drop-off locations; rider drop-off sequence/order; drop-off directions/positions; relative final destinations; etc.

The various components can include one or more sensors 104, one or more display devices 108, one or more light-emitting devices 906, and one or more speakers 908. In some examples, the one or more sensors 104 in the interior 900 can include, for example and without limitation, one or more image sensors (e.g., image and/or video cameras and/or camera sensors, etc.), seat sensors (e.g., seat occupancy sensors), seat belt sensors (e.g., seat belt tension sensors), inertial measurement units (IMUs), position sensors, GPS (Global Positioning System) devices, etc. The one or more display devices 108 can include, for example and without limitation, one or more screens, displays, televisions, tablet computers, touchscreens, and/or any other type of display device. Moreover, the light-emitting devices 906 can include, for example and without limitation, one or more light bulbs, light-emitting diodes (LEDs), lasers, reflectors, and/or any other suitable light source or device.

The interior 900 includes seats 902A-N to carry passengers and any passenger property such as bags, suitcases, equipment, etc. The seats 902A-N can be equipped with seat sensors (104) and/or seat belt sensors (104) that the autonomous vehicle 102 can use to detect whether there are any passengers in the vehicle, where a passenger(s) is/are seated, an orientation/position of a passenger, a seating arrangement of passengers, whether a particular seat is being used, whether a particular seat is in use by a passenger or an object (e.g., a bag or suitcase), one or more estimated characteristics of a passenger on a seat (e.g., weight, estimated size, etc.), etc.

For example, seat and seat belt sensors (104) on the rear seat 902C can be used to determine whether the rear seat 902C is occupied (e.g., based on a measured weight); if the rear seat 902C is occupied, whether it is occupied by a passenger or an object (e.g., based on a measured weight, a detected (or undetected) seat belt use, and/or other sensor measurements); the orientation/position of a passenger in the autonomous vehicle 102 (e.g., based on the passenger's detected use of the rear seat 902C, a measured distribution of weight on the rear seat 902C, etc.), which passenger from a group of ridesharing passengers is seated on the rear seat 902C (e.g., based on an order in which the ridesharing passengers were picked up and a time when a passenger was detected on the rear seat 902C and/or any other seats, etc.), etc.

In some cases, information about the type and configuration of the autonomous vehicle 102 (e.g., number of doors, number of seats, etc.) and/or data from other sensors (104) can also be used to determine whether there are any passengers in the vehicle, where a passenger(s) is/are seated, an orientation/position of a passenger, a seating arrangement of passengers, whether a particular seat is being used, whether a particular seat is in use by a passenger or an object (e.g., a bag or suitcase), one or more estimated characteristics of a passenger on a seat (e.g., weight, estimated size, etc.), etc. For example, the autonomous vehicle 102 can determine how many passengers are in the vehicle, where the passengers are seated (e.g., a position/location of each passenger) based on the type and configuration of the vehicle and/or measurements from one or more radars, position sensors, IMUs, LIDARs, etc.

In some cases, the autonomous vehicle 102 can use sensor data from one or more sensors 104 (e.g., radar measurements, position sensor measurements, IMU measurements, LIDAR measurements, image data from image sensors, etc.) to track a pose of a passenger (e.g., using a tracking algorithm such as a Kalman filter) in order to understand the position and location of that passenger throughout the trip. The autonomous vehicle 102 can use such information to provide instructions (e.g., exiting instructions, direction and/or orientation information, walking instructions, etc.) to the passenger based on the current and/or accurate position and location of the passenger. Moreover, in some cases, computer vision technologies, such as facial and/or object recognition, can be used to determine or verify whether a seat is occupied by a passenger or an object. For example, the autonomous vehicle 102 can implement process image data from one or more image sensors (104) to perform user, facial, and/or object recognition and determine whether a seat is occupied by a passenger or an object.

In some implementations, information obtained regarding the position/orientation of a passenger and/or where a passenger is seated can be used to, for example and without limitation, instruct the passenger on how and where to exit the vehicle (e.g., based on safety factors, convenience, optimal location to exit the vehicle in view of the direction and/or path to the final destination, etc.), which direction to go after exiting the vehicle, etc., and/or to help identify a drop-off point or pull-over location for dropping of the passenger. For example, if the autonomous vehicle 102 is pulling over at a drop-off point on a one-way street and determines that a passenger is seated on the rear left seat 902C, the autonomous vehicle 102 can instruct the passenger to use the rear right door 904B to exit the vehicle (e.g., to avoid incoming traffic and/or place the passenger at an optimal location to reach the final destination in the shortest time and/or with the most ease) and turn left to continue towards the final destination.

Moreover, the autonomous vehicle 102 can provide instructions and/or visual or audio cues using display devices 108, light-emitting devices 906, and/or speakers 908 in the interior 900 of the autonomous vehicle 102. For example, to instruct a passenger to use the rear left door 904A when exiting the vehicle, the autonomous vehicle 102 can turn on a light-emitting device 104 mounted on the rear left door 904A to provide a visual cue (e.g., light) informing the passenger to exit the vehicle from the rear left door 904A. As another example, the autonomous vehicle 102 can display information, such as a message with instructions or an instructional video, on a display device 108 mounted on the back of a front seat (e.g., 902A and/or 902B) to inform a passenger on one of the rear seats 902C or 902N to exit the vehicle from the rear right door 904B to avoid incoming traffic and/or to disembark from an optimal side for reaching the final destination (e.g., the closest side to the final destination, the side resulting in the shortest time to reaching the final destination, etc.). In another example, the autonomous vehicle 102 can output audio instructions from a speaker device 908 to inform a passenger on how to exit the vehicle and/or how to reach the final destination.

In some cases, the autonomous vehicle 102 can present interfaces (e.g., 500, 700) and/or information to a passenger using one or more display devices 108 mounted on the interior 900. For example, the autonomous vehicle 102 can display a message, camera feed, video, map, trip preview, input option, and/or any other information on one or more display devices 108 in the interior 900 to provide information, such as exiting instructions and wayfinding information, to a passenger and/or enable a passenger to submit or input information, such as requests or preferences, to the autonomous vehicle 102. In some examples, the autonomous vehicle 102 can use one or more display devices 108 in the interior 900 to display an external camera feed showing a view of the environment outside of the vehicle. The view of the environment outside of the vehicle can be helpful to a passenger in understanding the environment to guide the passenger in exiting the vehicle and/or walking towards the final destination.

For example, the view of the environment outside of the vehicle can show incoming traffic on one side and an incoming bicycle rider on another side to help inform the passenger on the best way and/or time to exit the vehicle to avoid the incoming traffic and the incoming bicycle rider. As another example, the view of the environment outside of the vehicle can show walking paths or building access areas in the environment to help the passenger understand where or how to walk or continue after exiting the vehicle.

Figure 10:
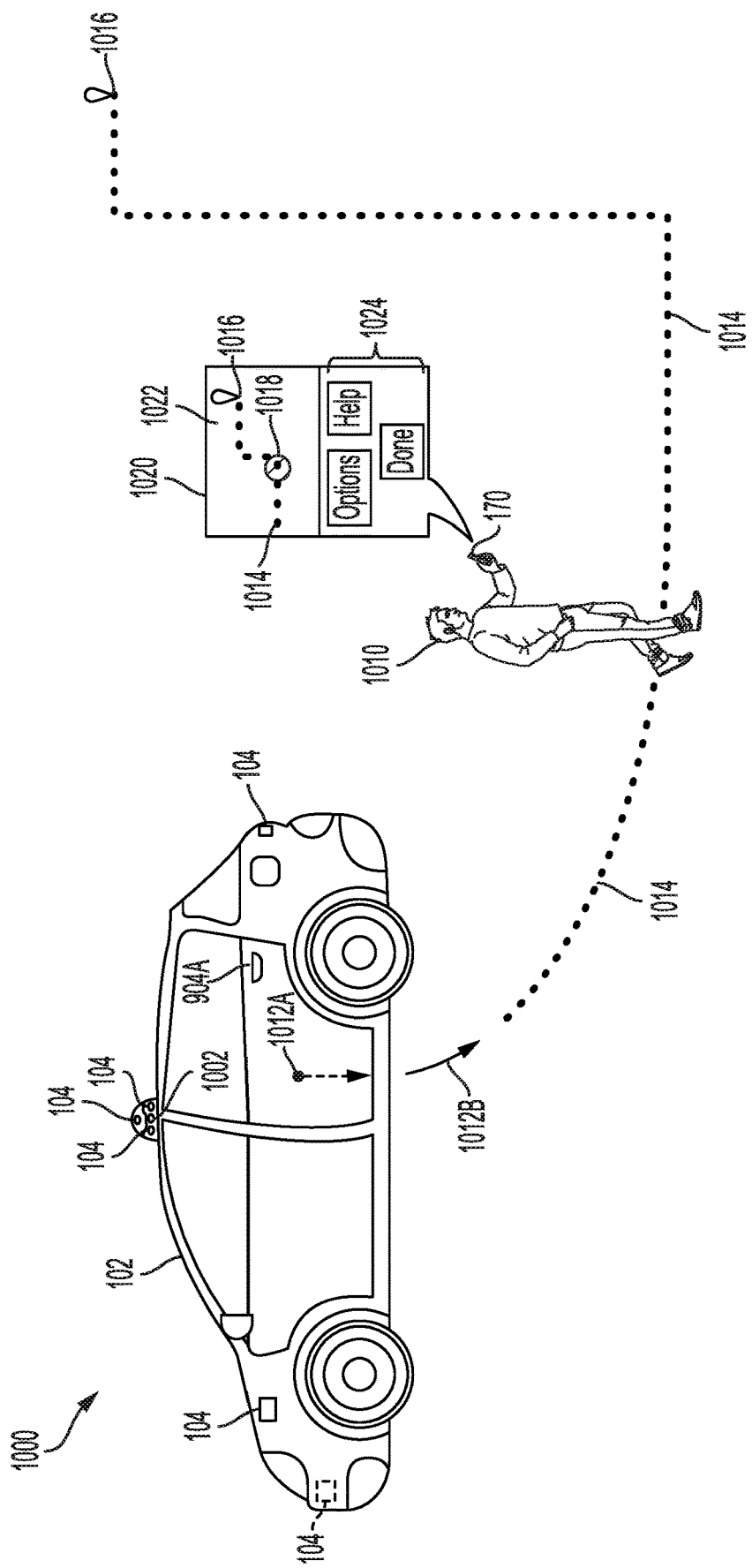
FIG. 10 illustrates an example of an autonomous vehicle providing a rider drop-off instructions and information, in accordance with some examples.

FIG. 10 illustrates an example of an autonomous vehicle 102 providing a passenger 1010 drop-off instructions and information. The drop-off instructions and information can include, for example and without limitation, instructions for exiting the vehicle and/or wayfinding information to help the passenger 1010 reach the final destination 1016 of the passenger 1010.

In some examples, when the passenger 1010 is in the autonomous vehicle 102 prior to being dropped off, the autonomous vehicle 102 can provide the passenger 1010 an indication 1012A of a side and door (e.g., rear left door 904A) to use to exit the autonomous vehicle 102 at drop off. In some cases, the indication 1012A can be, for example, a message or visual signal displayed on a display device 108 on the vehicle or presented on the client device 170 of the passenger 1010. In other cases, the indication 1012A can be a light emitted by a light-emitting device 906 on the vehicle, which signals to the passenger 1010 which door to use to exit the vehicle. For example, the autonomous vehicle 102 can flash a light on a light-emitting device 906 mounted on the rear left door 904A of the vehicle to signal to the passenger 1010 that the passenger 1010 should use the rear left door 904A to exit the vehicle.

In yet other cases, the indication 1012A can be an audio message or signal informing the passenger 1010 to use the rear left door 904A to exit the vehicle. The audio message or signal can be provided by a speaker 908 in the vehicle and/or a speaker on the client device 170 of the passenger 1010. Moreover, in some examples, the indication 1012A can include a combination of visual and/or audio indications or instructions provided via different devices. For example, the indication 1012A can include a message or visual signal displayed on a display device 108 on the vehicle and/or the client device 170 of the passenger 1010, a light emitted by a light-emitting device 906 on the vehicle, and/or an audio message or signal provided by a speaker 908 in the vehicle and/or on the client device 170 of the passenger 1010.

Upon the passenger 1010 exiting the autonomous vehicle 102, the autonomous vehicle 102 can provide an indication 1012B of a direction the passenger 1010 should travel towards the final destination 1016. In some cases, the indication 1012B can be a light emitted by an external light-emitting device 1002 mounted on an exterior (e.g., on the roof, on a door, etc.) of the autonomous vehicle 102. In some examples, the light can be emitted on the same side of the autonomous vehicle 102 as the direction that the passenger 1010 is instructed to travel, which the passenger 1010 can interpret as a signal that the passenger 1010 should travel in that direction. In other examples, the light can be emitted according to a pattern (e.g., a flashing pattern) that the passenger 1010 can interpret as indicating a specific direction to travel.

To illustrate, the external light-emitting device 1002 can be configured to output different patterns or light colors to provide different signals or indications to passengers. Each pattern or light color can signify, and can be interpreted as, an instruction to travel in a different direction. For example, a steady light or flash can signify a left direction, while a flashing light can signify a right direction. As another example, a red flash can signify a forward direction (e.g., the same direction as the current direction of the autonomous vehicle 102 and/or the passenger 1010) while a different color flash can signify a backward direction (e.g., a direction opposite to the direction of the autonomous vehicle 102 and/or the passenger 1010). Other patterns, colors, or techniques for conveying directional instructions using the external light-emitting device 1002 can also be used in other implementations.

The autonomous vehicle 102 can also provide wayfinding information on an interface 1020 displayed at the client device 170 of the passenger 1010. The interface 1020 can include a map 1022 depicting the current location 1018 of the passenger 1010 and a path 1014 to the final destination 1016. In some cases, the interface 1020 can also provide a map visualization from a street perspective, which can depict buildings and/or objects around the passenger 1010 and/or the surrounding environment. In some implementations, the street perspective visualization can be a three-dimensional (3D) visualization of buildings (e.g., including building faces) and/or the surrounding environment.

The interface 1020 can also include a section 1024 with one or more interface elements that allow the passenger 1010 to receive or select different options (e.g., alternate paths, alternate modes of travel, etc.), receive or provide information (e.g., notifications, requests, alerts, updates, etc.), and/or interact with the interface 1020 (e.g., submit a request for additional help from the autonomous vehicle 102, terminate the trip, change or specify map settings, change or specify interface settings, change or specify wayfinding preferences, etc.).

In some cases, the autonomous vehicle 102 can also provide wayfinding information to the passenger 1010 prior to the passenger 1010 exiting the vehicle. For example, before the passenger 1010 exits the vehicle, the autonomous vehicle 102 can provide a preview (e.g., via a display device 108) of the path 1014 from the drop-off location to the final destination 1016. As another example, before the passenger 1010 exits the vehicle, the autonomous vehicle 102 can provide the passenger 1010 visual and/or audio instructions or directions (e.g., via a display device 108, a speaker 908, etc.) for reaching the final destination 1016 after exiting the vehicle. O In some implementations, once the passenger 1010 has exited the autonomous vehicle 102, a handoff can occur between the autonomous vehicle 102 and the client device 170 of the passenger 1010 (and/or the interface 1020) to continue providing wayfinding information to the passenger 1010 through the interface 1020 presented on the client device 170 of the passenger 1010. In some examples, the handoff can occur when the passenger 1010 exits the autonomous vehicle 102. In other examples, the handoff can be triggered by one or more factors such as, for example and without limitation, a location of the passenger 1010, a proximity of the passenger 1010 to the autonomous vehicle 102 and/or the final destination 1016, a specific scenario or circumstance (e.g., noisy area, busy area, traveling distance from the drop-off point to the final destination 1016, etc.), and/or any other criteria.

The passenger 1010 can use the wayfinding information provided on the interface 1020 to continue towards the final destination 1016 and/or reach the final destination 1016. In some cases, if the passenger 1010 changes course or starts to go on the wrong direction, the autonomous vehicle 102 can inform the passenger 1010 (e.g., via the interface 1020 and/or the client device 170) that the passenger 1010 has deviated from the path 1014 to the final destination 1016 and/or provide the passenger 1010 course correction information (or an option to receive course correction information) and/or an alternate path from the current location of the passenger 1010.

In some cases, the autonomous vehicle 102 can detect if the passenger 1010 has changed course or started to go on the wrong direction using GPS information relayed or shared by the client device 170 of the passenger 1010. In other cases, the autonomous vehicle 102 can detect if the passenger 1010 has changed course or started to go on the wrong direction using a sensor 104 on the outside of the vehicle, such as a camera sensor mounted on an exterior of the autonomous vehicle 102. For example, the autonomous vehicle 102 can track the passenger 1010 using a camera (104) on the vehicle while the passenger 1010 is within a field of view of the camera. If the passenger 1010 starts to travel in the wrong direction, the autonomous vehicle 102 can detect so based on a feed from the camera.

In some implementations, the autonomous vehicle 102 can use both a sensor 104, such as a camera sensor as previously described, and GPS information from the client device 170 to detect if the passenger 1010 has changed course or started to travel in the wrong direction. Moreover, if the passenger 1010 does not wish to be tracked as previously described, the passenger 1010 can opt out of being tracked and can provide any other privacy preferences. The passenger 1010 can provide such preferences through interface 1020, the ridesharing application 172, an input device on the autonomous vehicle 102 (e.g., display device 108), etc.

In some cases, the autonomous vehicle 102 can use one or more sensors 104 on the outside of the vehicle to provide more granular wayfinding details and cues. For example, the autonomous vehicle 102 can use one or more camera sensors, radars, LIDARs, etc., to understand the environment and/or the passenger's position and direction and provide environment cues (e.g., notify the passenger 1010 about obstacles alerts, hazards, accessible or inaccessible areas along the path 1014, entrance locations, points of reference, etc.) and/or granular wayfinding details (e.g., shortcuts, wayfinding tips or suggestions, avoidances, description of where a building is located, description of where a door to enter an area or building is, an indication of which door or entrance to use to enter an area or building, etc.).

To illustrate, if an area along the path 1014 is blocked by construction or an event, the autonomous vehicle 102 can detect so using the one or more sensors 104. The autonomous vehicle 102 can then notify the passenger 1010 that the area along the path 1014 is blocked and provide instructions for avoiding the area and reaching the final destination 1016 from a deviated path.

Once the passenger 1010 has reached the final destination 1016 and/or decided to complete the trip, the passenger 1010 can end the trip through the interface 1020, which will signal to the autonomous vehicle 102 to finalize the trip and stop providing wayfinding information to the passenger 1010.

Figure 11:
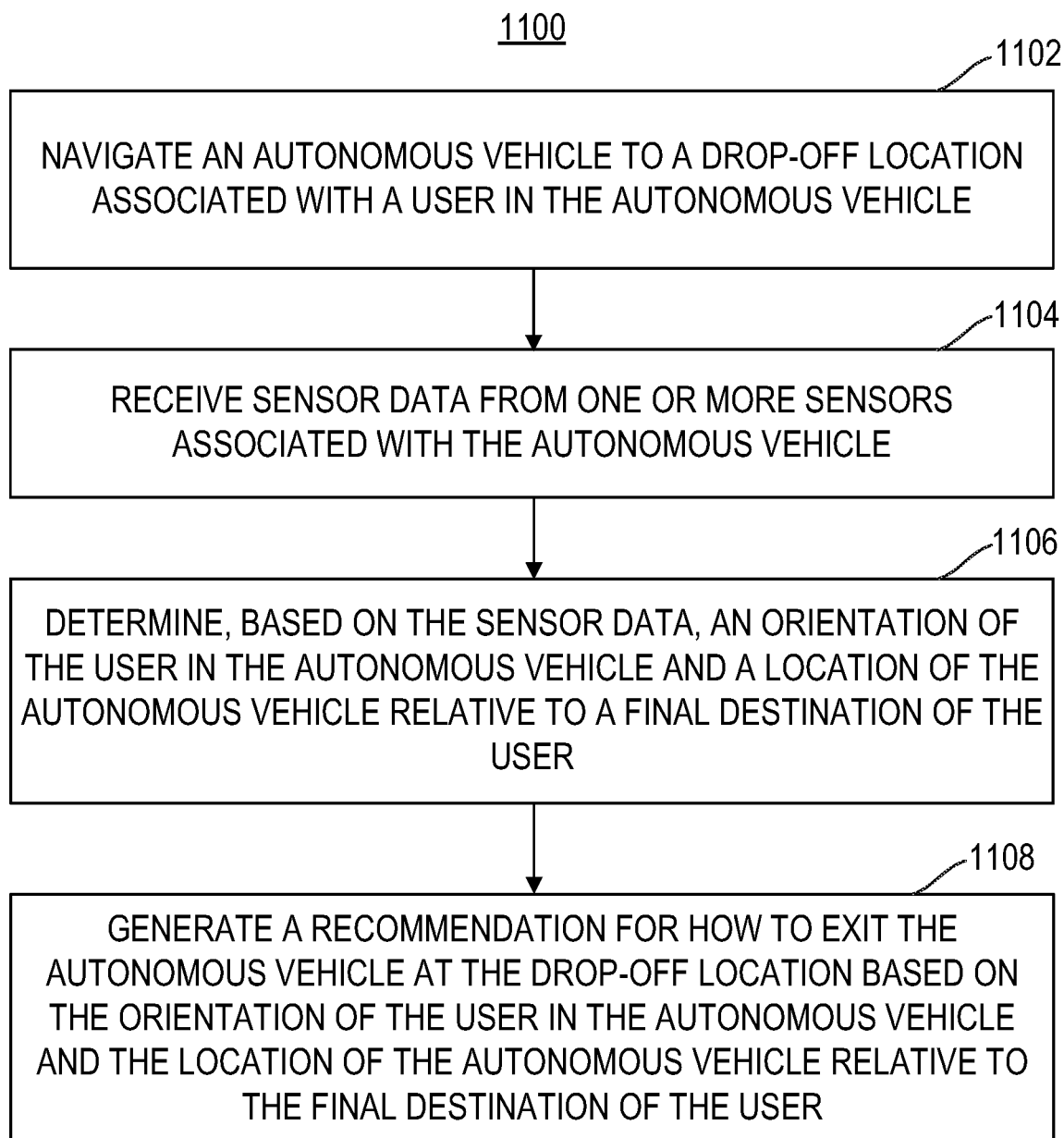
FIG. 11 illustrates an example method for providing a drop-off to destination user experience to riders of an autonomous vehicle, in accordance with some examples.

Having disclosed some example system components and concepts, the disclosure now turns to FIG. 11, which illustrates an example method 1100 for providing a drop-off to destination user experience. The steps outlined herein are exemplary and can be implemented in any combination thereof, including combinations that exclude, add, or modify certain steps.

At step 1102, the method 1100 can include navigating an autonomous vehicle 102 to a drop-off location associated with a user in the autonomous vehicle 102. The autonomous vehicle 102 can use an internal computing system 110 to navigate to the drop-off location. In some cases, the autonomous vehicle 102 can also use a remote computing system 150 (or receive instructions and/or data for navigating from the remote computing system 150) to navigate to the drop-off location. Moreover, the autonomous vehicle 102 can navigate based on data from one or more sensors 104, such as, for example and without limitation, one or more radars, LIDARs, cameras, GPS devices, IMUs, etc.

The user can be a rider of the autonomous vehicle 102 receiving a ride service from the autonomous vehicle 102. The ride service can be a trip from a requested pick-up location to the drop-off location. For example, the user can request a ride service from the autonomous vehicle 102. When requesting the ride service, the user can specific a pick-up location for the trip, a pick-up time, a drop-off location or target drop-off location, a final destination of the user, one or more user preferences, user information, a number of riders for the ride service, and/or any other trip or user information.

In some examples, the drop-off location can be defined by the user when requesting the ride service or selected (or adjusted) by the user during the trip. The user can select or adjust the drop-off location during the trip based on, for example and without limitation, one or more options or alternatives provided by the autonomous vehicle 102. The one or more options or alternatives can include different drop-off locations identified by the autonomous vehicle 102.

In other examples, the drop-off location can be predetermined or suggested by the autonomous vehicle 102. For example, the autonomous vehicle 102 can determine or suggest a drop-off location based on one or more factors such as, for example and without limitation, a proximity to a final destination of the user, traffic conditions, a user preference, weather conditions, one or more conditions in the area (e.g., road closures, side walk closures, road or walking obstacles or obstructions, nearby events, access to ingress or egress areas, nearby construction work, time of day, environment conditions, etc.), an estimated walking or traveling time to a final destination of the user, access to one or more modes of traveling to the final destination of the user, etc.

At step 1104, the method 1100 can include receiving sensor data from one or more sensors 104 associated with the autonomous vehicle 102. The one or more sensors 104 can include, for example and without limitation, one or more image sensors (e.g., camera sensors, cameras, etc.), LIDARs, radars, GPS sensors, seat sensors, seat belt sensors, etc. In some cases, the sensor data can include, for example and without limitation, seat sensor measurements indicating whether one or more seats are occupied, seat belt sensor measurements indicating whether one or more seat belts are engaged, image or video data identifying an occupancy state (e.g., how many users are in the autonomous vehicle 102, an arrangement of users in the autonomous vehicle 102, a location/orientation of a user within the autonomous vehicle 102, etc.) and/or in-cabin conditions (e.g., obstacles or obstructions, number of seats, number of doors, access to specific doors, etc.) in an interior 900 (e.g., a cabin system 138) of the autonomous vehicle 102, position and/or motion measurements indicating a pose of one or more users, etc.

At step 1106, the method 1100 can include determining, based on the sensor data, an orientation of the user in the autonomous vehicle 102 and a location of the autonomous vehicle 102 relative to a final destination of the user. In some examples, the autonomous vehicle 102 can determine (e.g., via the internal computing system 110) a seating location or position of the user within the autonomous vehicle 102. The autonomous vehicle 102 can then determine the orientation of the user based on the determined seating location or position of the user. In some cases, the autonomous vehicle 102 can determine the orientation (e.g., the seating location and/or pose of the user) based on seat sensor measurements, seat belt sensor measurements, image data (e.g., an image and/or video of the user and/or an interior of the autonomous vehicle 102), a map of the interior 900 of the autonomous vehicle 102, radar measurements of the interior 900 of the autonomous vehicle 102, LIDAR measurements of the interior 900 of the autonomous vehicle 102, a configuration of the autonomous vehicle 102, etc.

Moreover, the autonomous vehicle 102 can determine (e.g., via the internal computing system 110 and/or the remote computing system 150) the location of the autonomous vehicle 102 (and the user) relative to the final destination of the user based on, for example and without limitation, a location specified by the user as the final destination of the user and a current location of the autonomous vehicle 102. The current location of the autonomous vehicle 102 can be determined based on, for example and without limitation, GPS information, image data (e.g., captured images and/or video depicting a scene or surrounding environment of the autonomous vehicle 102), position measurements from one or more sensors, a user input specifying location information, etc.

At step 1108, the method 1100 can include generating a recommendation for how to exit the autonomous vehicle 102 at the drop-off location based on the orientation of the user in the autonomous vehicle 102 and the location of the autonomous vehicle 102 relative to the final destination of the user. In some examples, the recommendation for how to exit the autonomous vehicle 102 can include an indication (e.g., an instruction, a suggestion, a visualization, etc.) of which door to use to exit the autonomous vehicle 102.

The autonomous vehicle 102 can provide the recommendation to the user via, for example, a display 108 in the autonomous vehicle 102, a speaker 908 in the autonomous vehicle 102, a light-emitting device 906 in the autonomous vehicle 102, and/or a client device 170 associated with the user. In some cases, the recommendation can include a visual indication (e.g., a light, a visualization or graphical rendering, a map, a digital message or instruction, etc.) of an exit direction (e.g., left, right, forward/front, back/behind, east, west, south, north, etc.) or a door (e.g., rear left door 904A, rear right door 904B, front door, etc.) to use to exit the autonomous vehicle 102, audio instructions (e.g., an audio output or voice) for exiting the autonomous vehicle 102, and/or visual exit instructions rendered on a display 108.

In some aspects, the method 1100 can include generating (e.g., by the autonomous vehicle 102 and/or the remote computing system 150) wayfinding information to help the user navigate from the drop-off location to the final destination of the user. In some examples, the wayfinding information can be generated or determined based on the orientation of the user in the autonomous vehicle 102, the location of the autonomous vehicle 102 relative to the final destination of the user, a current location of the user relative to the final destination, environment conditions (e.g., traffic, weather, events, access routes or areas, nearby structures, surrounding conditions, obstacles or hazards, etc.), user preferences, map information, etc.

In some aspects, the method 1100 can include providing (e.g., by the autonomous vehicle 102 and/or the remote computing system 150) the wayfinding information via a display 108 in the autonomous vehicle 102, a speaker 908 in the autonomous vehicle 102, and/or a client device 170 associated with the user. The wayfinding information can include, for example and without limitation, a route, directions from the drop-off location to the final destination of the user, an audio output including the directions from the drop-off location to the final destination, a graphical preview of a path from the drop-off location to the final destination, a digital map including the directions from the drop-off location to the final destination, a street view of an area outside of the autonomous vehicle 102, and/or any other visual/audio wayfinding information or cues.

In some aspects, the method 1100 can include determining (e.g., by the autonomous vehicle 102 and/or the remote computing system 150) that the user has exited the autonomous vehicle 102, and sending (e.g., by the autonomous vehicle 102 and/or the remote computing system 150) wayfinding information to a client device 170 associated with the user. The wayfinding information can include, for example and without limitation, directions from a current location of the user to the final destination of the user, a digital map including the directions from the current location of the user to the final destination, a graphical preview of a path or route from the current location of the user to the final destination, audio instructions for navigating from the current location of the user to the final destination, a street view of an area outside of the autonomous vehicle 102, a camera feed of a surrounding environment, etc.

In some cases, the method 1100 can include tracking (e.g., by the autonomous vehicle 102 and/or the remote computing system 150) the user outside of the autonomous vehicle 102 based on sensor data obtained from one or more sensors 104, and sending a wayfinding update to the client device 170 associated with the user. The one or more sensors 104 can include, for example and without limitation, a camera sensor on an exterior of the autonomous vehicle 102, a radar sensor on the exterior of the autonomous vehicle 102, a LIDAR sensor on the exterior of the autonomous vehicle 102, a GPS sensor on a client device 170 associated with the user, an IMU sensor on the client device 170 associated with the user, etc.

The wayfinding update can be based on a tracked location of the user. In some examples, the wayfinding update can include, for example and without limitation, course correction instructions (e.g., if the user has deviated from a path or route), updated navigating instructions associated with the tracked location of the user and the final destination, an alternate route to the final destination, environment cues (e.g., obstacles or hazards, events, weather information, traffic information, access areas or paths, outside conditions, building information, entrance information or instructions, etc.), navigating tips or suggestions, etc.

In some implementations, the autonomous vehicle 102 can provide passengers in a ridesharing scenario instructions or suggestions of where to sit in the autonomous vehicle 102 to arrange the passengers in an optimal way for ease of exiting the autonomous vehicle 102 and/or navigating from respective drop-off locations to respective final destinations. For example, when picking up multiple riders for different ridesharing trips, the autonomous vehicle 102 can instruct the various passengers where to sit based on their drop-off locations, the order or sequence in which the autonomous vehicle 102 will reach the different drop-off locations, their final destinations, environment conditions associated with the drop-off locations (e.g., traffic, events, street directions, avoidance conditions, road closures, access conditions, etc.), user needs or preferences, and/or any other factors.

In some cases, the autonomous vehicle 102 can similarly provide a user in a single passenger scenario with instructions or suggestions of where to sit in the autonomous vehicle 102 for best accessibility to the optimal exit location (e.g., door) in the autonomous vehicle 102 and/or the optimal direction for traveling upon exiting the autonomous vehicle 102 to reach the final destination in the shortest time or distance.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 12:
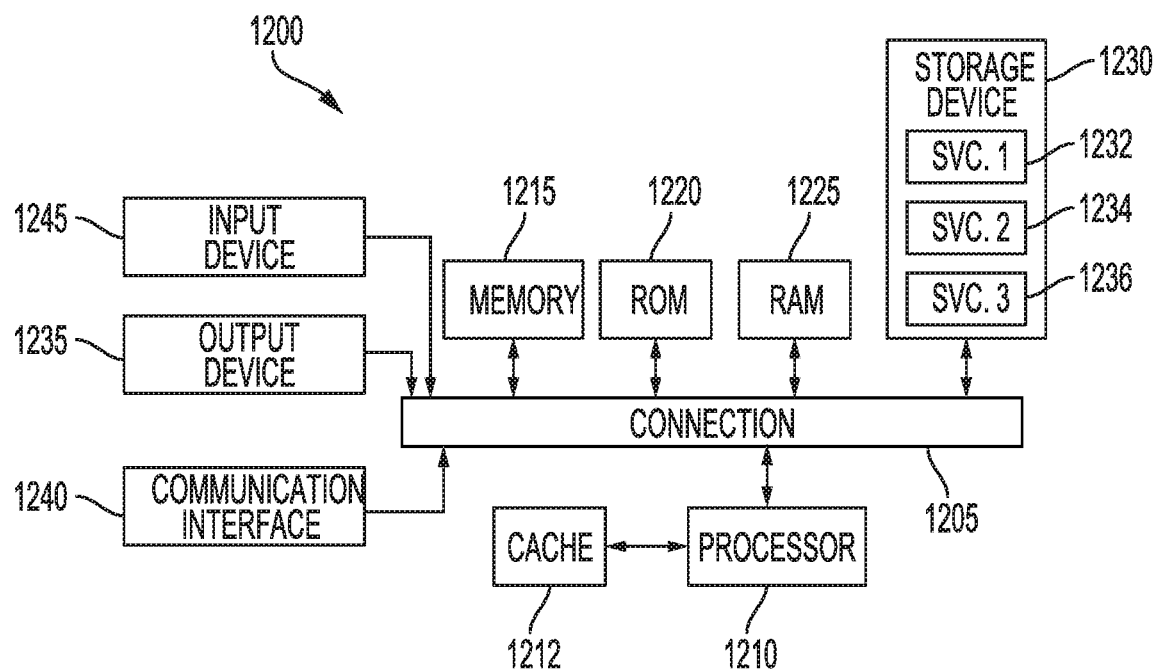
FIG. 12 illustrates an example computing system architecture for implementing various aspects of the present technology.

FIG. 12 illustrates an example computing system 1200 which can be, for example, any computing device making up internal computing system 110, remote computing system 150, a passenger device (e.g., 170) executing rideshare application 172, or any other computing device. In FIG. 12, the components of the computing system 1200 are in communication with each other using connection 1205. Connection 1205 can be a physical connection via a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement, and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   navigating an autonomous vehicle (AV) to a drop-off location associated with a user in the AV;
   receiving sensor data from one or more sensors associated with the AV;
   determining, based on the sensor data, an orientation of the user in the AV and a location of the AV relative to a final destination of the user;
   generating a recommendation for how to exit the AV at the drop-off location based on the orientation of the user in the AV and the location of the AV relative to the final destination of the user; and
   in response to the user exiting the AV, tracking the user outside of the AV based on additional sensor data obtained from one or more sensors.

2. The method of claim 1, wherein determining the orientation of the user in the AV comprises determining a seating location of the user within the AV, and wherein the recommendation for how to exit the AV comprises an indication of which AV door to use to exit the AV.

3. The method of claim 1, wherein the one or more sensors comprise at least one of a camera sensor, a light detection and ranging (LIDAR) sensor, a radar sensor, a seat sensor, a seat belt sensor, and a global positioning system (GPS) sensor.

4. The method of claim 1, further comprising:
   providing the recommendation via at least one of a display in the AV, a speaker in the AV, a light-emitting device in the AV, and the client device associated with the user, wherein the recommendation comprises at least one of a visual indication of an exit direction or an AV door to use to exit the AV, audio instructions for exiting the AV, and visual exit instructions rendered on the display.

5. The method of claim 1, further comprising:
   generating the wayfinding information comprising directions from the drop-off location to the final destination of the user.

6. The method of claim 5, wherein the wayfinding information is based on at least one of the orientation of the user in the AV, the location of the AV relative to the final destination, and a current location of the user relative to the final destination.

7. The method of claim 5, further comprising:
   providing the wayfinding information via at least one of a display in the AV, a speaker in the AV, and the client device associated with the user, wherein the wayfinding information comprises at least one of an audio output comprising the directions from the drop-off location to the final destination, a graphical preview of a path from the drop-off location to the final destination, a digital map comprising the directions from the drop-off location to the final destination, and a street view of an area outside of the AV.

8. The method of claim 1, further comprising:
   determining that the user has exited the AV; and
   sending wayfinding information to a client device associated with the user, the wayfinding information comprising at least one of directions from a current location of the user to the final destination of the user, a digital map comprising the directions from the current location of the user to the final destination, a graphical preview of a path from the current location of the user to the final destination, audio instructions for traveling from the current location of the user to the final destination, and a street view of an area outside of the AV.

9. The method of claim 8, further comprising:
   sending a wayfinding update to the client device associated with the user, the wayfinding update being based on a tracked location of the user, wherein the one or more sensors for tracking the user after exiting the AV comprises at least one of a camera sensor on an exterior of the AV, a radar sensor on the exterior of the AV, a LIDAR sensor on the exterior of the AV, and a GPS sensor integral to the client device associated with the user.

10. The method of claim 9, wherein the wayfinding update comprises at least one of course correction instructions, updated navigating instructions associated with the tracked location of the user and the final destination, an alternate route to the final destination, and environment cues.

11. An autonomous vehicle comprising:
    a mechanical system;
    a motor control system in communication with the mechanical system;
    one or more processors; and
    memory comprising instructions stored thereon which, when executed by the one or more processors, cause the one or more processors to:
    navigate the autonomous vehicle (AV) to a drop-off location associated with a user in the AV;
    receive sensor data from one or more sensors associated with the AV;
    determine, based on the sensor data, an orientation of the user in the AV and a location of the AV relative to a final destination of the user;
    generate a user recommendation for how to exit the AV at the drop-off location based on the orientation of the user in the AV and the location of the AV relative to the final destination of the user; and
    in response to the user exiting the vehicle, track the user outside of the AV based on additional sensor data obtained from one or more sensors.

12. The autonomous vehicle of claim 11, wherein determining the orientation of the user in the AV comprises determining a seating location of the user within the AV, wherein the user recommendation for how to exit the AV comprises an indication of which AV door to use to exit the AV, and wherein the one or more sensors comprise at least one of a camera sensor, a light detection and ranging (LIDAR) sensor, a radar sensor, a seat sensor, a seat belt sensor, and a global positioning system (GPS) sensor.

13. The autonomous vehicle of claim 11, wherein the memory comprises additional instructions which, when executed by the one or more processors, cause the one or more processors to:

provide the user recommendation via at least one of a display in the AV, a speaker in the AV, a light-emitting device in the AV, and the client device associated with the user, wherein the user recommendation comprises at least one of a visual indication of an exit direction or an AV door to use to exit the AV, audio instructions for exiting the AV, and visual exit instructions rendered on a display.

14. The autonomous vehicle of claim 11, wherein the memory comprises additional instructions which, when executed by the one or more processors, cause the one or more processors to:

generate the wayfinding information comprising directions from the drop-off location to the final destination of the user, wherein the wayfinding information is based on at least one of the orientation of the user in the AV, the location of the AV relative to the final destination, and a current location of the user relative to the final destination.

15. The autonomous vehicle of claim 14, wherein the memory comprises additional instructions which, when executed by the one or more processors, cause the one or more processors to:

provide the wayfinding information via at least one of a display in the AV, a speaker in the AV, and the client device associated with the user, wherein the wayfinding information comprises at least one of an audio output comprising the directions from the drop-off location to the final destination, a graphical preview of a path from the drop-off location to the final destination, a digital map comprising the directions from the drop-off location to the final destination, and a street view of an area outside of the AV.

16. The autonomous vehicle of claim 11, wherein the memory comprises additional instructions which, when executed by the one or more processors, cause the one or more processors to:

determine that the user has exited the AV; and
send wayfinding information to a client device associated with the user, the wayfinding information comprising at least one of directions from a current location of the user to the final destination of the user, a digital map comprising the directions from the current location of the user to the final destination, a graphical preview of a path from the current location of the user to the final destination, audio instructions for traveling from the current location of the user to the final destination, and a street view of an area outside of the AV.

17. The autonomous vehicle of claim 11, wherein the memory comprises additional instructions which, when executed by the one or more processors, cause the one or more processors to:

send a wayfinding update to the client device associated with the user, the wayfinding update being based on a tracked location of the user, wherein the wayfinding update comprises at least one of course correction instructions, updated navigating instructions associated with the tracked location of the user and the final destination, an alternate route to the final destination, and environment cues, wherein the one or more sensors for tracking the user after exiting the AV comprises at least one of a camera sensor on an exterior of the AV, a radar sensor on the exterior of the AV, a LIDAR sensor on the exterior of the AV, and a GPS sensor integral to the client device associated with the user.

18. A non-transitory computer-readable storage medium comprising:

instructions stored on the non-transitory computer-readable storage medium, wherein the instructions, when executed by one or more processing devices, cause the one or more processing devices to:

navigate an autonomous vehicle (AV) to a drop-off location associated with a user in the AV;
receive sensor data from one or more sensors associated with the AV;
determine, based on the sensor data, an orientation of the user in the AV and a location of the AV relative to a final destination of the user;
generate a user recommendation for how to exit the AV at the drop-off location based on the orientation of the user in the AV and the location of the AV relative to the final destination of the user; and
track the user outside of the AV based on additional sensor data obtained from one or more sensors, the one or more sensors comprising at least one of a camera sensor on an exterior of the AV.

19. The non-transitory computer-readable storage medium of claim 18, wherein determining the orientation of the user in the AV comprises determining a seating location of the user within the AV, wherein the user recommendation for how to exit the AV comprises an indication of which AV door to use to exit the AV, and wherein the one or more sensors comprise at least one of a camera sensor, a light detection and ranging (LIDAR) sensor, a radar sensor, a seat sensor, a seat belt sensor, and a global positioning system (GPS) sensor.

20. The non-transitory computer-readable storage medium of claim 18, storing instructions which, when executed by the one or more processing devices, cause the one or more processing devices to:

determine that the user has exited the AV;
send wayfinding information to a client device associated with the user, the wayfinding information comprising at least one of directions from a current location of the user to the final destination of the user, a digital map comprising the directions from the current location of the user to the final destination, a graphical preview of a path from the current location of the user to the final destination, audio instructions for traveling from the current location of the user to the final destination, and a street view of an area outside of the AV;
send a wayfinding update to the client device associated with the user, the wayfinding update being based on a tracked location of the user, the wayfinding update comprising at least one of course correction instructions, updated navigating instructions associated with the tracked location of the user and the final destination, an alternate route to the final destination, and environment cues,
wherein the one or more sensors for tracking the user after exiting the AV comprises at least one of a camera sensor on an exterior of the AV, a radar sensor on the exterior of the AV, a LIDAR sensor on the exterior of the AV, and a GPS sensor integral to the client device associated with the user.

* * * * *